United States Patent
Saito

(10) Patent No.: US 9,857,994 B2
(45) Date of Patent: Jan. 2, 2018

(54) STORAGE CONTROLLER, CONTROL METHOD, AND COMPUTER PRODUCT

(71) Applicant: FUJITSU LIMITED, Kawasaki-shi, Kanagawa (JP)

(72) Inventor: Hironori Saito, Yokohama (JP)

(73) Assignee: FUJITSU LIMITED, Kawasaki (JP)

(*) Notice: Subject to any disclaimer, the term of this patent is extended or adjusted under 35 U.S.C. 154(b) by 365 days.

(21) Appl. No.: 14/553,250

(22) Filed: Nov. 25, 2014

(65) Prior Publication Data
US 2015/0169240 A1 Jun. 18, 2015

(30) Foreign Application Priority Data
Dec. 18, 2013 (JP) .................................. 2013-261843

(51) Int. Cl.
*G06F 3/06* (2006.01)
*G06F 12/02* (2006.01)
(Continued)

(52) U.S. Cl.
CPC ............ *G06F 3/0619* (2013.01); *G06F 3/065* (2013.01); *G06F 3/0689* (2013.01); *G06F 11/00* (2013.01); *G06F 11/14* (2013.01); *G06F 12/0246* (2013.01)

(58) Field of Classification Search
CPC .... G06F 12/0246; G06F 3/0619; G06F 3/065; G06F 3/0689
See application file for complete search history.

(56) References Cited

U.S. PATENT DOCUMENTS 7,330,930 B1 * 2/2008 Nagshain .............. G06F 3/0611
711/114
2008/0181018 A1 7/2008 Nagatomi et al.
(Continued)

FOREIGN PATENT DOCUMENTS

JP 2001-290791 10/2001
JP 2008-181380 8/2008
(Continued)

OTHER PUBLICATIONS

Japanese Office Action dated May 23, 2017 in corresponding Japanese Patent Application No. 2013-261843.

*Primary Examiner* — Adam M Queler
*Assistant Examiner* — Edmund Kwong
(74) *Attorney, Agent, or Firm* — Staas & Halsey LLP

(57) ABSTRACT

A storage controller that performs control for storing in memory areas of a storage device, data that is grouped into redundant data in blocks each having a given data size. The storage controller includes a memory unit configured to store therein group information created by grouping performed such that logical addresses for a writing destination identified from a data writing request are correlated with the blocks; and a control unit configured to count in response to a data reading request, number of times of reading from a group including logical addresses for a reading destination identified from the reading request, based on the group information, and issues any one among a reading request that includes the logical addresses for the reading destination and a reading request that includes logical addresses for a memory destination of redundant data corresponding to data of the logical addresses for the reading destination.

9 Claims, 17 Drawing Sheets

(51) Int. Cl.
  *G06F 11/00* (2006.01)
  *G06F 11/14* (2006.01)

(56) References Cited

U.S. PATENT DOCUMENTS

2009/0193174 A1* 7/2009 Reid ................ G06F 12/0246
                                              711/100
2010/0325522 A1  12/2010 Tsukamoto et al.
2013/0179634 A1* 7/2013 Munireddy ........ G06F 11/2058
                                              711/114

FOREIGN PATENT DOCUMENTS

| JP | 2012-203642 | 10/2012 |
| JP | 2012-238259 | 12/2012 |
| WO | WO 2009/107213 A1 | 9/2009 |

* cited by examiner

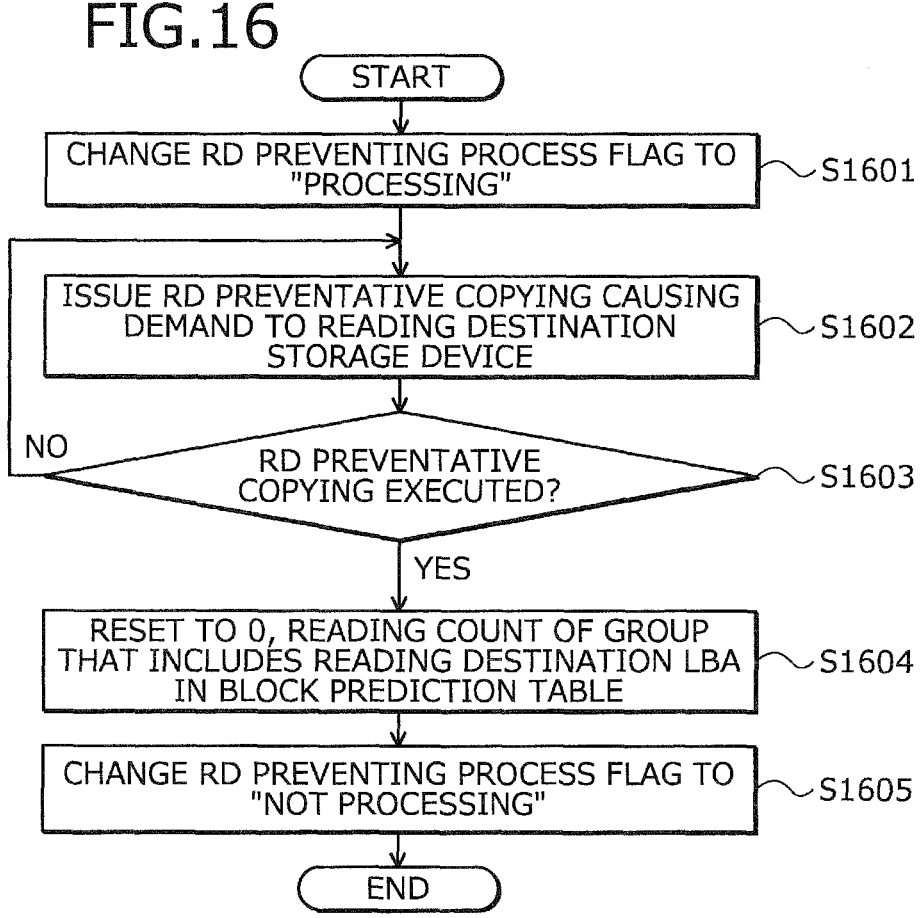

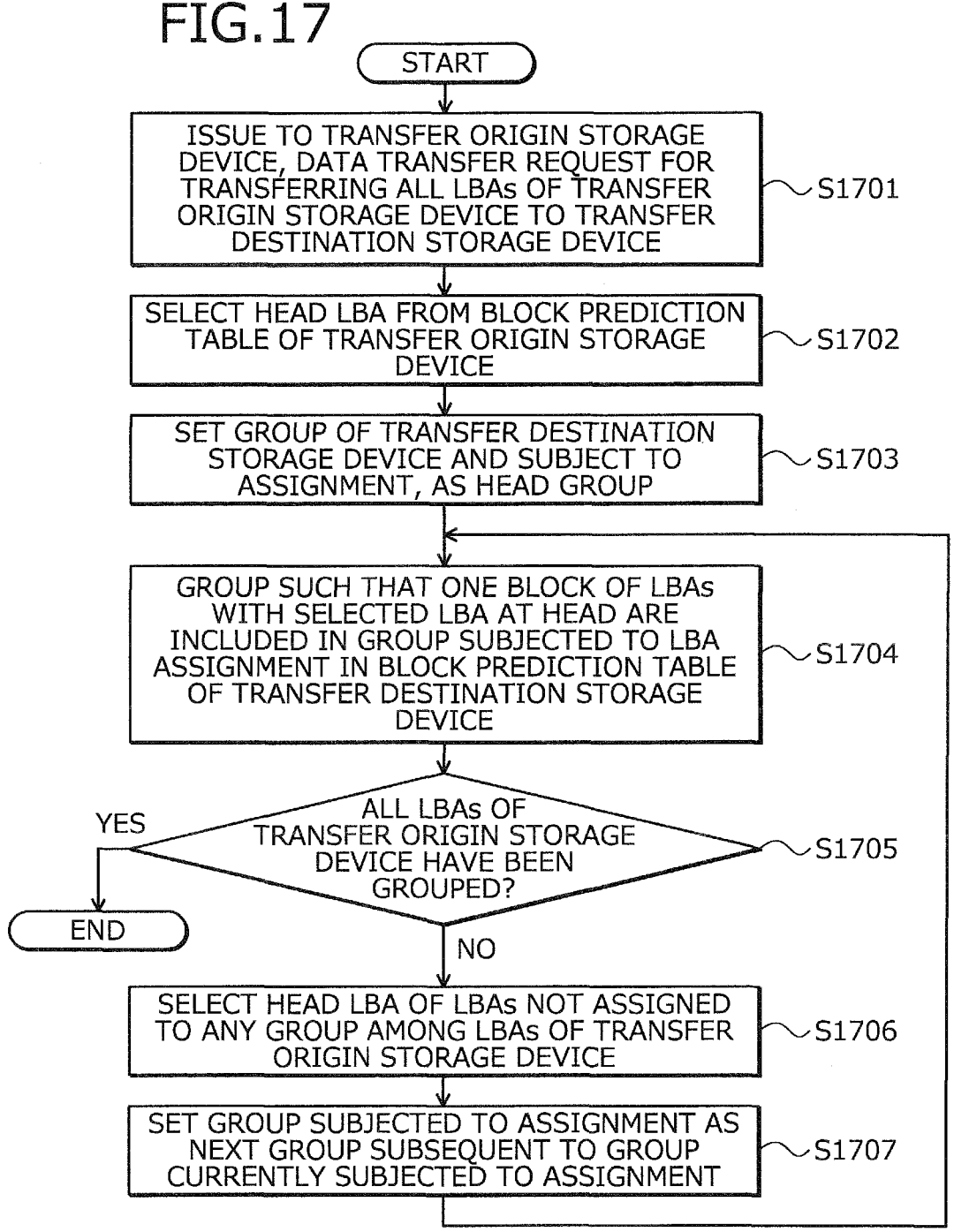

STORAGE CONTROLLER, CONTROL METHOD, AND COMPUTER PRODUCT

CROSS REFERENCE TO RELATED APPLICATIONS

This application is based upon and claims the benefit of priority of the prior Japanese Patent Application No. 2013-261843, filed on Dec. 18, 2013, the entire contents of which are incorporated herein by reference.

FIELD

The embodiments discussed herein are related to a storage controller, a control method, and a computer product.

BACKGROUND

A storage device having flash memory as nonvolatile memory has been known. When data is read from the flash memory, voltage is applied to a floating gate, which causes the volume of electrons on the floating gate to change. For this reason, repeated data reading from a certain block leads to a great variation of the volume of electrons, thus causing a bit error, which is referred to as read disturb. To prevent read disturb, inside the storage device that includes the flash memory, the number of times of reading (reading count) is managed and data in the block is copied to a different block when reading is executed a given number of times.

For example, according to a prior technique related to the above process, whether reading is executed at the flash memory or at random access memory (RAM) is controlled according to the frequency of reading from the flash memory and when the frequency of data reading from a given area exceeds a certain value, data in the flash memory is transferred to the RAM. According to another known technique, data reading from flash memory, at which the limited number of times of data reading is allowed because of read disturb, and updating of the number of times of reading for refreshing the flash memory are controlled, based on an access command from a host personal computer (PC). According to still another known technique, when data reading from flash memory is not completed within a given time in a data restoring process, the data reading is suspended, additional data is set, and then data that is to be pushed and created by correcting erroneous data using parity data is written to cache memory (see, e.g., Japanese Laid-Open Patent Publication Nos. 2001-290791 and 2008-181380 and International Publication No. 2009/107213.)

According to the conventional techniques, however, the process of preventing read disturb occurring inside the storage device that includes the flash memory may lead to a drop in response performance to a reading request for the storage device.

SUMMARY

According to an aspect of an embodiment, a storage controller that performs control for storing in memory areas of a storage device, data that is grouped into redundant data in blocks each having a given data size. The storage controller includes a memory unit configured to store therein group information created by grouping performed such that logical addresses for a writing destination identified from a data writing request are correlated with the blocks; and a control unit configured to count in response to a data reading request, number of times of reading from a group including logical addresses for a reading destination identified from the reading request, based on the group information, and issues any one among a reading request that includes the logical addresses for the reading destination and a reading request that includes logical addresses for a memory destination of redundant data corresponding to data of the logical addresses for the reading destination.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 16 is a flowchart of an example of an RD preventative copying causing procedure; and FIG. 17 is a flowchart of an example of a refreshing procedure.

DESCRIPTION OF EMBODIMENTS

Embodiments of a storage controller, a control method, and a computer product will be described in detail with reference to the accompanying drawings.

Figure 1:
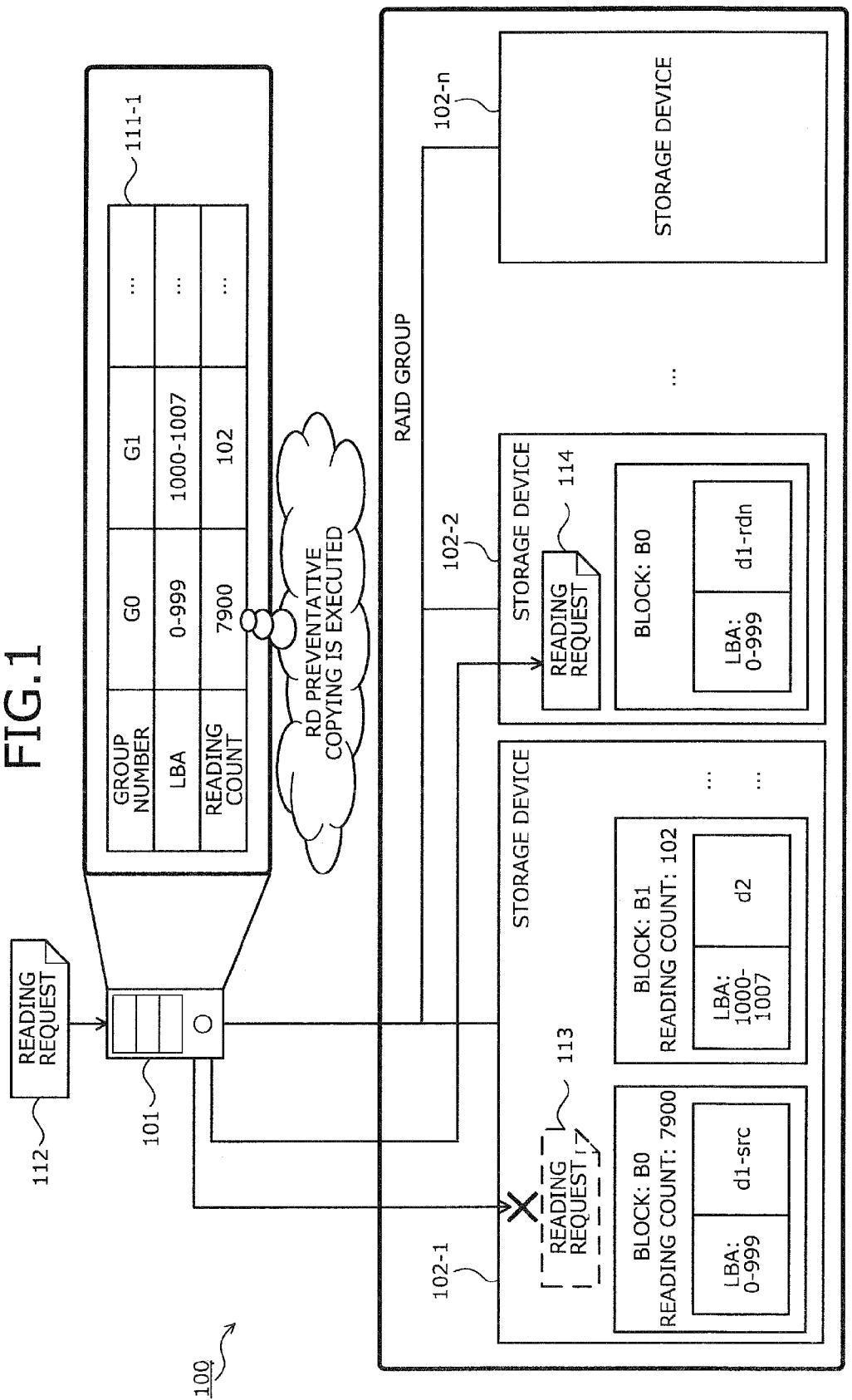
FIG. 1 is an explanatory diagram of an example of operation of a storage controller according to an embodiment.

FIG. 1 is an explanatory diagram of an example of operation of a storage controller according to an embodiment. A storage system 100 of FIG. 1 is a system that provides a user of the storage system 100 with memory area of the storage system 100. For example, the storage system 100 stores therein document files and a database made by the user of the storage system 100.

The storage system 100 includes a storage controller 101 that controls the entire storage system 100, and storage devices 102-1, 102-2, ..., 102-n having memory areas provided by the storage system 100. n represents an integer of 1 or more.

To reduce the response time for responding to a reading request for memory area provided by the storage system 100, a solid state drive (SSD) is used as the storage device 102. Hereinafter, a simple statement "storage device 102" means a storage device provided as an SSD. In this embodiment, at least one of the storage devices 102-1 to 102-n is a storage device provided as an SSD. In the example of FIG. 1, the storage device 102-1 is a storage device provided as an SSD. The storage system 100 provides the user with a virtual volume formed by using the technique of redundant arrays of independent disks (RAID). Using the RAID technique, the storage controller 101 performs control for data redundancy in blocks of a given data size and storing data in the memory area of the storage device 102. RAID will be described later, referring to FIG. 2.

The SSD is a drive device using flash memory as memory medium. For example, the SSD has the flash memory, cache memory that temporarily stores therein received writing data and the stored contents of the flash memory, and an SSD controller.

The flash memory is semiconductor memory that allows data deletion or writing in blocks into which a memory area is divided for each given data size and that has a property of maintaining data even when the power supply is cut off. The given management data size (hereinafter, "block data size") is a value that is set by the designer of the flash memory according to the specification of the flash memory when it is manufactured.

For example, the flash memory has multiple memory cells each storing 1-bit data therein. The memory cell has two n-type semiconductor portions serving as a source and a drain between which a P-type semiconductor layer on a silicon board is sandwiched. A floating gate is disposed above the P-type semiconductor layer via an insulating film, and a control gate is disposed on the floating gate. The memory cell stores information using the volume of electrons accumulated at the floating gate. For example, the memory cell stores information, utilizing a phenomenon that whether current flows from the source to the drain or not depends on the volume of electrons on the floating gate. Whether current flows from the source to the drain or not depends on the volume of electrons for the following reasons. Electrons present on the floating gate increase resistance between the source and the drain, in which case current does not flow unless the gate voltage is raised. Absence of electrons on the floating gate, on the other hand, decreases resistance between the source and the drain, in which case current flows even if the gate voltage is low. The voltage applied to the gate required for causing current to flow from the source to the drain is referred to as threshold voltage. The flash memory is provided as a NOR-type flash memory or a NAND-type flash memory.

The SSD controller controls the flash memory and the cache memory. For example, the SSD controller temporarily stores writing data to received logical addresses in the cache memory. The SSD controller then divides the writing data stored in the cache memory for each block data size, stores the divided data in blocks in order, and stores information indicative of the corresponding relation between blocks having stored data and the logical addresses in the flash memory. The relation between writing data and a writing destination block varies depending on the specification of the SSD. For example, an interval of issuing writing data to the SSD affects the relation between the writing data and the writing destination block in some cases. At the SSD, logical block addressing (LBA) is adopted as a method of logical addressing. Hereinafter, a logical address is simply referred to as LBA. The internal operation of the SSD will be described later, referring to FIGS. 6 to 8.

LBAs for a writing request issued from the storage controller 101 to the storage device 102 are identified from LBAs for the writing request in a virtual volume created by an apparatus operated by the user. Similarly, LBAs for a reading request issued from the storage controller 101 to the storage device 102 are identified from LBAs for the reading request in a virtual volume created by the apparatus operated by the user. For example, it is assumed that the storage controller 101 forms a virtual volume of RAID0 using the storage devices 102-1 and 102-2. In this case, the storage controller 101 forms LBA0 to LBA3 of the virtual volume in order of LBA0 of the storage device 102-1, LBA0 of the storage device 102-2, LBA1 of the storage device 102-1, LBA1 of the storage device 102-2, .... When the storage controller 101 receives a writing request for the virtual volume created by the apparatus operated by the user, the storage controller 101 identifies LBAs for the writing request and the storage device 102 to which the request is issued, using the quotient and the remainder obtained by dividing the LBAs for the writing request by 2.

A hard disk drive (HDD) takes about 10 milliseconds for data processing from the issue of a reading request until the completion of data reception, while an SDD takes several milliseconds for the same job. The storage device provided as the SDD, therefore, can reduce the response time for a reading request to a time shorter than the response time of the storage device provided as the HDD.

However, a continual sending of reading requests to the SSD may lead to a case where the response to the reading request becomes delayed. One case of a delay in the response to a reading request is a case where the timing of a garbage collection operation or timing of an operation for preventing a bit error caused by read disturb overlaps the timing of processing a reading request.

Garbage collection is an operation of collecting small blocks on a page to secure a data recording area. Read disturb is a phenomenon of repeated data reading causing bit error, and is a characteristic of semiconductor memory that accumulates electrons. Read disturb tends to occur frequently in NAND-type flash memory. A bit error caused by read disturb is an error in which a written value is not read correctly.

The read disturb phenomenon will be described in detail. Data is written in units of blocks to the flash memory used in the memory medium inside the SSD. At a point that data is written to a block, if no electrons are present at the floating gate, the threshold voltage is low and therefore, a sufficient margin to the voltage to be applied upon data reading is ensured. However, when reading requests are made repeatedly to any one of cells in the block, voltage is applied also to other cells in the same block. This causes the volume of electrons held by the floating gate to change gradually, reducing the difference (margin) between the threshold voltage and the voltage applied upon data reading, thus causing bit error. To prevent this, the SSD manages the number of times each block is read from, and when the reading is executed a prescribed number of times, performs control for copying data in the block to a different block. Hereinafter, this control is referred to as "RD preventative copying".

Since RD preventative copying is an operation inside the SSD, it is difficult for a device that accesses the SSD to acquire information on when RD preventative copying is to be executed. For this reason, the device that accesses the SSD may possibly make a reading request for a block to be subjected to RD preventative copying while the SSD is executing RD preventative copying. In such a case, because the SSD reads data and makes a completion response after completion of RD preventative copying, the device that accesses the SSD has to stand by until RD preventative copying is completed. When RD preventative copying and garbage collection are executed at an overlapping timing, in particular, the device that accesses the SSD is forced to stand by for a long time. In such a case, for example, the device may fail to receive the completion response for 1 second or longer.

The storage controller 101 counts the number of times of reading from a group created by grouping LBAs for a writing request issued to the storage device 102 in blocks. The storage controller 101 then issues a reading request including LBAs identified from LBAs of a received reading request or a reading request including LBAs for a storage destination of redundant data corresponding to data of the identified LBAs, according to the counted number of times of reading from the group. This allows the storage controller 101 to assume LBAs expected to trigger RD preventative copying and thereby, avoid issuing a reading request for LBAs expected to cause a response delay. Hence, a drop in response performance to a reading request can be suppressed.

Control for counting the number of times of reading from a group created by grouping LBAs for a writing request in blocks and issuing a reading request according to the counted number of times of reading from the group will hereinafter be described in detail.

As describe above, the SSD divides a series of writing data for each block data size and stores the divided data in blocks in sequence. The storage controller 101, therefore, stores group information on grouping by which LBAs for a writing destination identified from a writing request received by the storage controller 101 are grouped such that the data size corresponding to LBAs included in the same group does not exceed the block data size (the data size is less than or equal to the block data size). The storage controller 101 registers group information of one storage device 102 into a block prediction table 111. The storage controller 101 may generate group information by grouping before issuing a writing request to the storage device 102 or may generate group information by grouping after issuing a writing request to the storage device 102. The storage controller 101 may generate group information on multiple writing requests already issued to the storage device 102.

The storage controller 101 manages each block prediction table 111 corresponding to each storage device 102. In the example of FIG. 1, the storage controller 101 manages a block prediction table 111-1 corresponding to the storage device 102-1.

In the example of FIG. 1, a data size for 1000 LBAs matches the block data size, and the storage controller 101 issues a writing request to LBA0-1007 to the storage device 102-1. The storage controller 101 generates group information on grouping by which LBA0-999 is assigned to a group G0 and LBA1000-1007 to a group G1. Receiving the writing request from the storage controller 101 to LBA0-1007, the storage device 102-1 assigns LBA0-999 to a block B0 and LBA1000-1007 to a block B1. In the following description, for simplicity, a group Gx may be simply written as "Gx", and, similarly, a block Bx may be simply written as "Bx". x represents an integer of 0 or more.

According to an incoming reading request 112, the storage controller 101 then counts the number of times of reading from a group including LBAs for a reading destination identified from the reading request 112, based on the block prediction table 111-1. The storage controller 101 may count the number of times of reading upon identifying the LBAs for the reading destination from the reading request 112 or may count the number of times of reading before or after issuing a reading request including the LBAs for the reading destination to the storage device 102-1.

FIG. 1 depicts a case where the reading request 112 addressed to LBA0-999 of the storage device 102-1 as a reading destination is made 7900 times and a reading request addressed to LBA1000-1007 of the storage device 102-1 as a reading destination is made 102 times. In this case, the storage controller 101 counts the number of times of reading from G0 at 7900 [times] and the number of times of reading from G1 at 102 [times]. The storage device 102-1 receives the reading request from the storage controller 101, the request including LBA0-999 as the reading destination, 7900 times, and receives the reading request from the storage controller 101, the request including LBA1000-1007 as the reading destination, 102 times. The storage device 102-1 then sets the number of times of reading from B0 to 7900 [times] and the number of times of reading from B1 to 102 [times].

Subsequently, based on the counted number of times of reading from the group, the storage controller 101 issues a reading request 113 including LBAs for the reading destination identified from the reading request 112 or a reading request 114 including LBAs for the storage destination of redundant data corresponding to data of the LBAs for the reading destination. In FIG. 1, the reading request 113 is indicated by a dotted line to suggest that actually, the reading request 113 is not issued. In the example of FIG. 1, the storage controller 101 dose not issue the reading request 113 but issues the reading request 114.

The reading requests 113 and 114 will be described. For simpler description, data of the LBAs for the reading destination included in the reading request 113 is referred to as "original data".

Redundant data is, for example, identical in contents with data stored in memory area indicated by the LBAs for the reading destination included in the reading request 113. Redundant data may be data that can be processed into the data identical in contents with the original data.

The storage controller 101 performs control on the issue destination of the reading request 114 so that the issue destination of the reading request 114 can be identified from the LBAs included in the reading request 112 or the LBAs included in the reading request 113 through a RAID configuration. FIG. 1 depicts an example of RAID1. di-src, d2, and d1-rdn depicted in FIG. 1 will be described together with RAID of FIG. 2.

An example of issuing the reading request 113 or the reading request 114 based on the counted number of times of reading from a group will be described. For example, the storage controller 101 stores, in advance, a first count that is less than the prescribed number of times set according to the specification of the storage device 102-1. The first count is set by the administrator of the storage system 100. The storage controller 101 issues the reading request 113 until the counted number of times of reading from a group reaches the first count. When the counted number of times of reading from the group reaches the first count, the storage controller 101 issues the reading request 114. Hereinafter, a value compared with the number of times of reading from a group will be referred to as "RD preventative copying threshold". A different RD preventative copying threshold may be set for each storage device 102.

After issuing the reading request 113 or reading request 114, the storage controller 101 acquires reading data based on data included in a response from the issue destination, and sends the reading data to the user. For example, when having issued the reading request 113, the storage controller 101 transmits data identical in contents with data included in the response from the issue destination to the apparatus operated by the user. When having issued the reading request 114, the controller 101 restores the contents of the original data out of redundant data included in a response from the issue destination, using the RAID technique, and transmits the restored data to the apparatus operated by the user. In the example of FIG. 1, the controller 101 transmits data identical in contents with data d1-rdn to the apparatus operated by the user. Restoration of the original data as reading data by the RAID technique will be described later, referring to FIGS. 9 and 10. An example of connections of the storage system will be described, referring FIG. 2.

Figure 2:
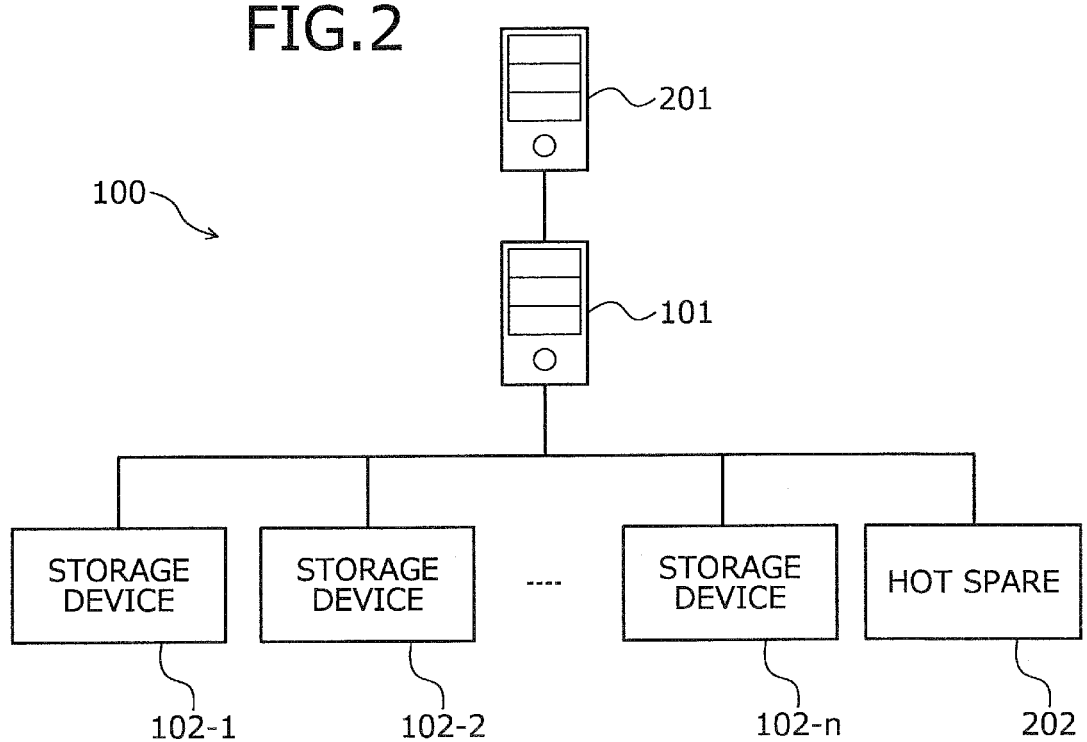
FIG. 2 is an explanatory diagram of an example of connections of a storage system.

FIG. 2 is an explanatory diagram of an example of connections of the storage system. The storage system 100 includes a host server 201, the storage controller 101, the storage devices 102-1, 102-2, . . . and 120-n, and a hot spare 202. The host server 201 is connected to the storage controller 101. The storage devices 102-1, 102-2, . . . and 120-n and the hot spare 202 are connected to the storage controller 101.

The host server 201 is the device that receives a request for access to the storage devices 102-1, 102-2, . . . and 120-n, from the apparatus operated by the user of the storage system 100. The hot spare 202 serves as a spare device for substituting one of the storage devices 102-1, 102-2, . . . and 120-n.

The RAID technique will be described. The storage system 100 forms one virtual volume through the RAID technique. A group of storage devices that form a virtual volume are referred to as storage devices included in a RAID group.

The RAID technique offers RAID levels representing different methods of forming a virtual volume. Basically, the RAID levels range from RAID0 to RAID6. The RAID technique also offers a combination of LAID levels, such as RAID0+1. For example, RAID0 represents a RAID level at which data with no redundancy is distributed to multiple storage devices. RAID1 represents a RAID level at which the same data is stored in two storage devices.

RAID1 will be described with reference to FIG. 1, which depicts an example of RAID1. If the storage device 102-1 stores therein the original data and redundant data, the storage controller 101 issues the reading request 114 to the storage device 102-1. For example, in the storage device 102-1, data d1-src is stored at LBA0-999 and data d2 is stored at LBA1000-1007. In the storage device 102-2, data di-rdn identical in contents with data d1 is stored at LBA0-999. In this case, the storage controller 101 issues the reading request 114 indicating LBAs for a reading destination as LBA0-999, to the storage device 102-2.

The storage devices 102-1 to 102-3 may form RAID5. In the same manner as in the above case, if LBAs for a reading destination included in a reading request 1 is LBAs in the storage device 102-1, the storage controller 101 issues the reading request 114 to the storage devices 102-2 and 102-3 in which redundant data is stored.

By forming RAID, the storage system 100 can provide the user with memory area with high reliability achieved by data redundancy on the condition that the RAID level is not RAID0. Forming RAID allows access distributed to multiple storage devices 102. As a result, the storage system 100 can provide the user with a memory area that allows a quick access response.

A technique of distributing data to multiple storage devices 102 to achieve high-speed data input/output is referred to as striping, by which blocks of X-byte data are arranged in order in virtual volumes making up a RAID group, respectively. Each block of X-byte data is referred to as "strip". One data set created by combining together a horizontal series of strips arranged in storage devices 102 making up the RAID group is referred to as "stripe".

In the example of FIG. 2, the storage controller 101 has the function of a RAID controller that forms a virtual volume to provide the host server 201 with the formed virtual volume. The host server 210 provided with the virtual volume accesses the storage controller 101 using logical addresses of the virtual volume. The storage controller 101 converts logical addresses of the virtual volume into LBAs of the storage device 102 and accesses the storage device 102, using the LBAs. In the following description, it is assumed for simplicity that logical addresses for an access destination accessed by the host server 201 are already converted into LBAs of the storage device 102.

Figure 3:
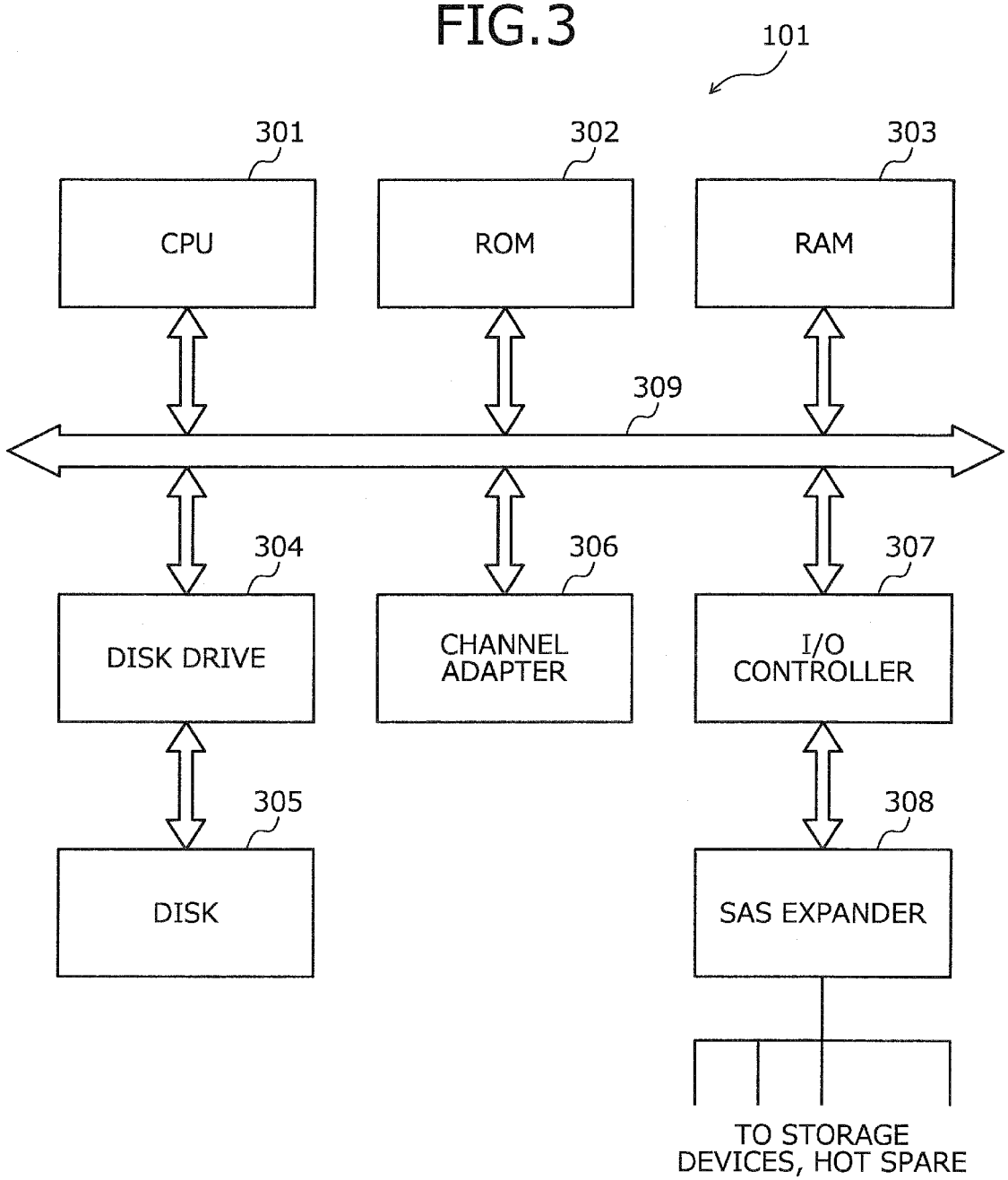
FIG. 3 is a block diagram of an example of a hardware configuration of the storage controller.

FIG. 3 is a block diagram of an example of a hardware configuration of the storage controller. In FIG. 3, the storage controller 101 includes a central processing unit (CPU) 301, read-only memory (ROM) 302, and RAM 303. The storage controller 101 also includes a disk drive 304, a disk 305, a channel adaptor 306, an I/O controller 307, and a serial attached SCSI (SAS) expander 308. The CPU 301 to the disk drive 304, the channel adaptor 306, and the I/O controller 307 are interconnected through a bus 309.

The CPU 301 is a processing unit that supervises overall control of the storage controller 101. The CPU 301 may be a multi-core processor having multiple processor cores. The ROM 302 is nonvolatile memory storing programs including a boot program. The RAM 303 is volatile memory used as a work area for the CPU 301.

The disk drive 304 is a controller that controls the reading and writing of data with respect to the disk 305 under control by the CPU 301. For example, a magnetic disk drive, SSD, etc., can be adopted as the disk drive 304. The disk 305 is nonvolatile memory that stores data written thereto under control by the disk drive 304. When the disk drive 304 is a magnetic disk drive, the disk 305 may also be provided as a magnetic disk. When the disk drive 304 is an SSD, the disk 305 may be provided as semiconductor memory.

The channel adaptor 306 is an adaptor connected to the host server 201. The I/O controller 307 is a controller that controls the input and output of data between the storage devices 102-1, 102-2, . . . and 102-n and the hot spare 202. The SAS expander 308 is a device that enables connection of multiple SAS devices. The storage devices 102-1, 102-2, . . . and 102-n and the hot spare 202 are devices conforming to the SAS standards.

The storage controller 101 may have a keyboard and mouse for an assumed case of direct manipulation of the storage controller 101 by the administrator, etc., of the storage system 100.

Figure 4:
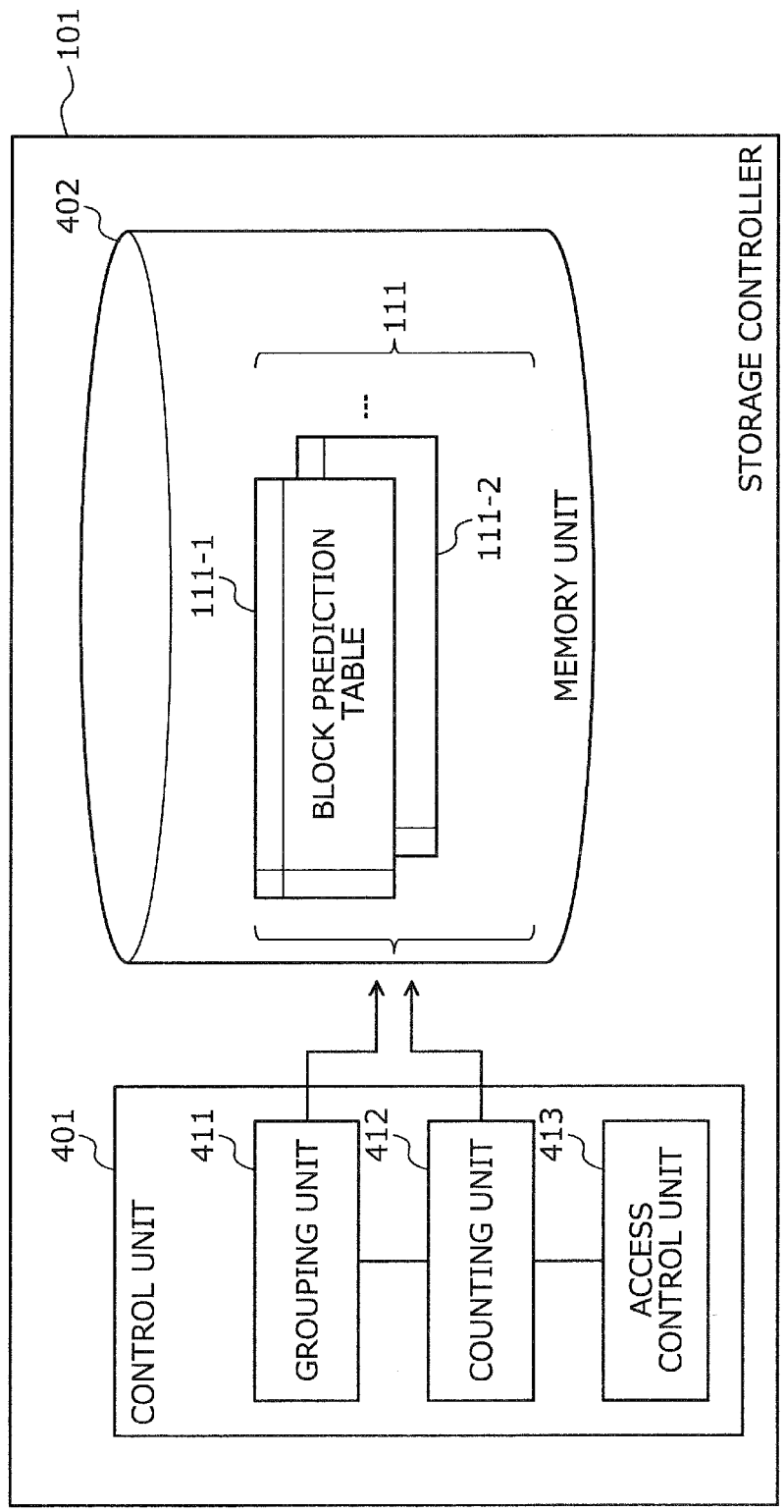
FIG. 4 is a block diagram of an example of a functional configuration of the storage controller.

The functions of the storage controller 101 will be described. FIG. 4 is a block diagram of an example of a functional configuration of the storage controller. The storage controller 101 includes a control unit 401 and a memory unit 402. The control unit 401 has a grouping unit 411, a counting unit 412, and an access control unit 413. The control unit 401 exerts its function when the CPU 301 executes a control program that is for controlling the storage device of this embodiment and stored in a memory device. The memory device is, for example, any one of the ROM 302, the RAM 303, the disk 305, etc., of FIG. 3. Process results from the grouping unit 411 to the access control unit 413 are stored in a memory device, such as RAM 303 and disk 305.

The storage controller 101 can access the memory unit 402 storing therein the block prediction table 111. The memory unit 402 is stored in a memory device, such as RAM 303 and disk 305. An example of the stored contents of the block prediction table 111 will be described later, referring to FIG. 5.

According to a writing request received by the storage controller 101, the grouping unit 411 groups LBAs for a writing destination identified from the writing request such that the data size corresponding to LBAs included in the same group does not exceed a block data size. The grouping unit 411 may perform grouping such that an interval of issuing a writing request including LBAs included in the same group to the storage device 102 does not exceed a given interval d1. The given interval d1 is a value related to the specification of the SSD, representing a time interval during which the SSD waits for the next writing request before writing data to the flash memory upon receiving a writing request. When the given time interval di elapses from the point of reception of a given writing request, the SDD writes data to the flash memory without waiting for the next writing request. The given interval di is a value set by the administrator of the storage system 100. The administrator of the storage system 100 checks the specification of the storage device 102 and sets the given interval di. An example of grouping and the given interval di will be described later, referring to FIG. 6.

According to a reading request received by the storage controller 101, the counting unit 412 counts the number of times of reading from a group including LBAs for a reading destination identified from the reading request. A specific example of counting of the number of times of reading from a group will be described later, referring to FIG. 7.

The counting unit 412 may reset the number of times of reading from the group. Timing of the resetting may be based on a process result from the access control unit 413 and therefore, will be described following description of the access control unit 413.

Based on the number of times of reading from the group, the access control unit 413 issues a reading request including the LBAs for the reading destination or a reading request including LBAs for the storage destination of redundant data corresponding to data of the LBAs for the reading destination. In response to the counted number of times of reading from the group having reached the first count, the access control unit 413 may issue a reading request including LBAs included in the group a second count or keeps issuing to the storage device 120, the reading request until the response time to the reading request exceeds a given time. For example, the access control unit 413 issues a reading request including LBAs included in the group to the storage device 120 after the counted number of times of reading from the group reaches the first count. The access control unit 413 may issue a reading request including LBAs included in the group to the storage device 120 after the counted number of times of reading from the group reaches the first count and then a response from the storage device 120 to the reading request is received.

The second count is a value given by subtracting the first count from the prescribed number of times set according to the specification of the storage device 120. The given time is a value set according to the specifications of the storage controller 101 and the storage device 102, and is given by, for example, adding a fixed value to the average of response times to a reading request. For example, before providing services, the storage controller 101 issues a reading request several times to the storage device 102 and determines the average of time taken from the issue of requests to reception of responses to the requests to be an ordinary response time, and then sets a value given by adding a fixed value to the ordinary response time, as the given time. The fixed value is a value set by the administrator of the storage system 100.

When issuing, for the second count, the reading request including the LBAs included in the group or continually issuing to the storage device 102, the reading request until the response time to the reading request exceeds the given time, the access control unit 413 determines that RD preventative copying has been executed by the storage device 102. Because issuing the reading request to the storage device 102 causes it to execute RD preventative copying, a reading request issued after the number of time of reading from the group reaches the first count will hereinafter be referred to as "RD preventative copying causing command". The RD preventative copying causing command may be "Read", which is a reading request, or may be "Verify", which is a command for verifying the accuracy of a storage destination.

The method of determining that RD preventative copying has been executed when issuing, for the second count, the RD preventative copying causing command will be referred to hereinafter as "first method of determining RD preventative copying execution". The method of determining that RD preventative copying has been executed when continually issuing the RD preventative copying causing command to the storage device 102 until the response time exceeds the given time will hereinafter be referred to as "second method of determining RD preventative copying execution".

As an example of the first method of determining RD preventative copying execution, a case is assume where the RD preventative copying threshold is 7700 [times] and the prescribed number of times that causes RD preventative copying is 8000 [times], in which case the second count is calculated at 300 [times]. In this case, responding to the counted number of times of reading from the group reaching 7700 times, the storage controller 101 issues the RD preventative copying causing command 300 [times], at which the storage controller 101 determines that RD preventative copying has been executed. When employing the first method of determining RD preventative copying execution, the storage controller 101 can determine execution of RD preventative copying by comparing the number of times of command issuing. The first method of determining RD preventative copying execution, therefore, reduces load resulting from the determination process, compared to the second method of determining RD preventative copying execution.

When employing the second method of determining RD preventative copying execution, the storage controller 101 does not have to store the number of times of occurrence of RD preventative copying by the storage device 102. When employing the second method of determining RD preventative copying execution, therefore, the storage controller 101 can execute the second method of determining RD preventative copying execution even if not knowing the prescribed number of times that causes the storage device 102 to execute RD preventative copying.

While issuing the RD preventative copying causing command, in response to the issue of a writing request including LBAs included in a group to the storage device 102, the access control unit 413 may stop issuing a reading request including logical addresses included in the group.

A case is assumed where the counted number of times of reading from a group has reached the first count at a certain storage device 102 and then the storage controller 101 receives a reading request. According to the received reading request, when LBAs identified from the reading request are included in the above group, the access control unit 413 may issue to a different storage device 102, a reading request including LBAs for the storage destination of redundant data corresponding to data of LBAs for a reading destination.

The different storage device 102 is a device that stores redundant data of data stored by a certain storage device 102. It is assumed, for example, that the storage devices 102-1 to 102-3 form RAID5 and that the storage device 120-1 stores data 1 therein, the storage device 120-2 stores data 2 therein, and the storage device 120-3 stores parity data generated from the data 1 and data 2. In this case, the storage device 102-3 storing the party data therein and the storage device 102-2 storing the data 2 therein are equivalent to different storage devices.

The counting unit 412 may reset the number of times of reading from a group when determining that RD preventative copying has been executed by the access control unit 413. The counting unit 412 may reset the number of times of reading from a group in response to the issue of a writing request including LBAs included in the group to the storage device 102. While the access control unit 413 issues the RD preventing copy causing command, the counting unit 412 may reset the number of times of reading from a group in response to the issue of a writing request including LBAs included in the group to the storage device 102.

A function to be used when a certain storage device 102 and a different storage device 102 are identical in block data size and in prescribed number of times will be described.

According to a writing request to the different storage device 102, the grouping unit 411 groups LBAs for a writing destination included in the writing request such that the data size corresponding to LBAs included in the same group does not exceed the block data size. According to a reading request to the different storage device 102, the counting unit 412 counts the number of times of reading from a group including LBAs for a reading destination included in the reading request.

In response to the counted number of times of reading from the group reaching a third count, the access control unit 413 issues, for a fourth count, a reading request that includes the LBAs included in the group or continues issuing such a reading request to the different storage device 102, until the response time to the reading request exceeds a given time. The third count is smaller than the prescribed number of times set according to the specification of the storage device 102 and is different from the first count. The fourth count is given by subtracting the third count from the prescribed number of times. In the case of two storage devices being identical in block data size and in prescribed number of times will be described later, referring to FIGS. 9 and 10.

A function to be used for transferring data of a storage device 102 to another storage device 102 provided as an SSD will be described. The reason for data transfer will be described later, referring to FIGS. 11 and 12. The storage device 120 as a transfer destination is, for example, the hot spare 202 not used. In the following description, the transfer destination storage device 120 is assumed to be the hot spare 202.

The access control unit 413 issues to the storage device 102, a data transfer request including LBAs included in multiple groups created by grouping LBAs for a writing destination of the storage device 102 identified from a received writing request. At this time, the access control unit 413 issues the data transfer request so that an interval of transferring data to the hot spare 202 does not exceed the given interval di. The grouping unit 411 groups the LBAs included in the issued data transfer request such that the data size corresponding to LBAs included in the same group does not exceed the block data size of the hot spare 202.

The grouping unit 411 also groups LBAs for a writing destination of the hot spare 202 identified from the received writing request such that the data size corresponding to LBAs included in the same group does not exceed the block data size. According to a received reading request, the counting unit 412 counts the number of times of reading from a group including LBAs for a reading destination of the hot spare 202 identified from the received reading request. Based on the counted number of times of reading from the group, the access control unit 413 issues a reading request including the logical addresses for the reading destination or a reading request including logical addresses for the storage destination of redundant data corresponding to data of the logical addresses for the reading destination.

Figure 5:
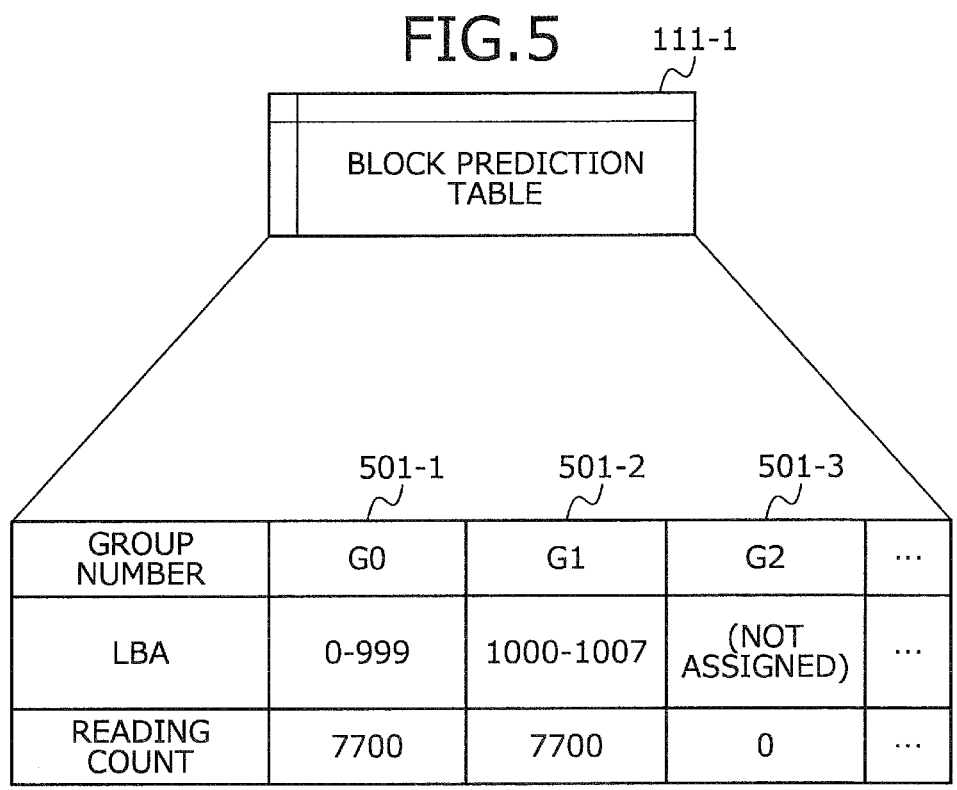
FIG. 5 is an explanatory diagram of an example of contents stored by a block prediction table.

FIG. 5 is an explanatory diagram of an example of the stored contents of the block prediction table. Among storage devices 102, each storage device 102 provided as an SSD has the block prediction table 111. For example, the block prediction table 111-1 of FIG. 5 is the table indicating the relation between blocks and LBA assignment of the storage device 102-1. The block prediction table 111-1 of FIG. 5 has records 501-1 to 501-3.

The block prediction table 111 has three fields including group number, LBA, and reading count. The group number field is a field for recording group identification numbers that are given when logical addresses for a writing destination included in a writing request are grouped such that the data size corresponding to logical addresses included in the same group does not exceed the block data size. The LBA field is a field for recording LBAs assigned to groups by the grouping. The reading count field is the field for recording the numbers of times of reading from groups.

For example, a record 501-1 represents a group G0 created by grouping based on an assumption that LBA0-999 is assigned to one block, indicating that the number of times of reading from the group G0 is 7700 [times].

An example of operations executed for the reading and writing of data with respect to the storage device 102-1 will be described with reference to FIGS. 6 to 8. In this embodiment, for simpler description, it is assumed that the block data size of one block in each storage device 102 provided as an SSD is 512 [K bytes], and that 1000 LBAs can be assigned to one block. One LBA, therefore, has a memory area of 512 [bytes].

Figure 6:
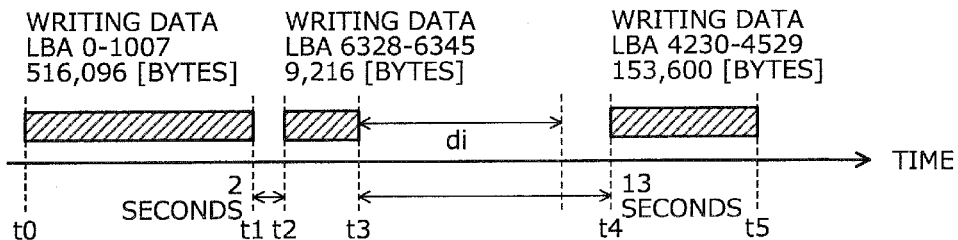
FIG. 6 is an explanatory diagram of an example of operation for data writing.

FIG. 6 is an explanatory diagram of an example of operation for data writing. FIG. 6 is used to describe an example in which the block prediction table 111 is updated when data is written to the storage device 120-1 provided as an SSD. In the following description, a writing request with no LBA for a writing destination assigned is referred to as "new writing request", and a writing request with LBAs for a writing destination assigned is referred to as "overwriting request".

The ordinary internal operation of the SSD will be described. The SSD assigns multiple LBAs to blocks (512 MB, etc.). Usually, this assignment is not a fixed operation but is performed such that LBAs are correlated with blocks in sequence when data is written. The SSD controller in the SSD temporarily saves incoming transferred data to the cache memory in the SSD, and writes a unit of collected data to the flash memory. The SSD executes data collecting work in priority, but when an interval of issuing transfer data exceeds the given interval di, e.g., 10 seconds, the SSD writes data immediately to the flash memory without waiting for incoming data to follow, in order to prevent data loss caused by power cutoff. In the case of a new writing request, the SSD controller does not write incoming data to a block to which a unit of data has already been written. When new data is transferred to the SSD, the SSD controller writes the new data to the next block.

Based on the above operation of the SSD, the storage controller 101 performs a similar administrative operation, thereby assumes the corresponding relation between blocks and LBA assignment. Hence, the storage controller 101 assigns a group of LBAs that are assumed to be assigned to the same block by the storage device 102, to the same group.

As a specific prediction example, a case is assumed where the storage controller 101 receives the following first to third writing requests from the host server 201. The relation between blocks and LBA assignment in this case will be described. It is also assumed that each of the first to third writing requests is a new writing request. When receiving a writing request, the storage controller 101 refers to the block prediction table 111 and determines whether the received writing request is a new writing request or an overwriting request. This process is not described in FIG. 6 but will be described with reference to FIG. 8. In FIG. 6, for the storage device 102 to which no LBA is assigned yet, an LBA-assignment group to which the storage controller 101 is assigning LBAs including LBAs for a writing destination included in a writing request is the group G0.

The first writing request is issued during a period between time t0 and time t1, and is the writing request with LBAs for a writing destination being LBA0-1007. The data size of LBA0-1007 is 516,096 [bytes]. The second writing request is issued during a period between time t2, which is 2 seconds later than time t1, and time 3, as a writing request to LBA6328-6345, of which the data size is 9,216 [bytes]. The third writing request is issued during a period between time t4, which is 13 seconds later than time t3, and time 5, as a writing request to LBA4230-4529, of which the data size is 153,600 [bytes]. After receiving the first to third writing requests, the storage controller 101 issues each to the storage device 102.

At time t0, the storage device 101 performs grouping such that LBA0-999 among the LBAs for the writing destination included in the first writing request is included in the LBA-assignment group G0. When space for LBAs runs out in G1, the storage controller 101 designates G1 as the next LBA-assignment group, G1 being the next group following the current LBA-assignment group. The storage device 101 then performs grouping such that LBA1000-1007 among the LBAs for the writing destination included in the first writing request is included in the LBA-assignment group G1.

When receiving the second writing request at time t2, the storage controller 101 leaves the LBA-assignment group G1 as it is because an interval between completion of the first writing request and the issue of the second writing request does not exceed the given interval d1. The storage controller 101 then performs grouping such that LBA6328-6345 for the writing destination included in the writing request is included in the LBA-assignment group G1. The storage controller 101 determines whether 10 seconds has elapsed during a period between time 1 to time t2 by starting a timer at time t1 and checking whether the time indicated by the timer at time t2 has exceeded 10 seconds. The storage controller 101 prepares a timer for each storage device 102.

Subsequently, when receiving the third writing request at time t4, the storage controller 101 designates the next group G2 as the next LBA-assignment group because the interval between completion of the second writing request and the issue of the third writing request exceeds the given interval d1. The storage controller 101 then performs grouping such that LBA4230-4529 for the writing destination included in the third writing request is included in the LBA-assignment group G2.

Figure 7:
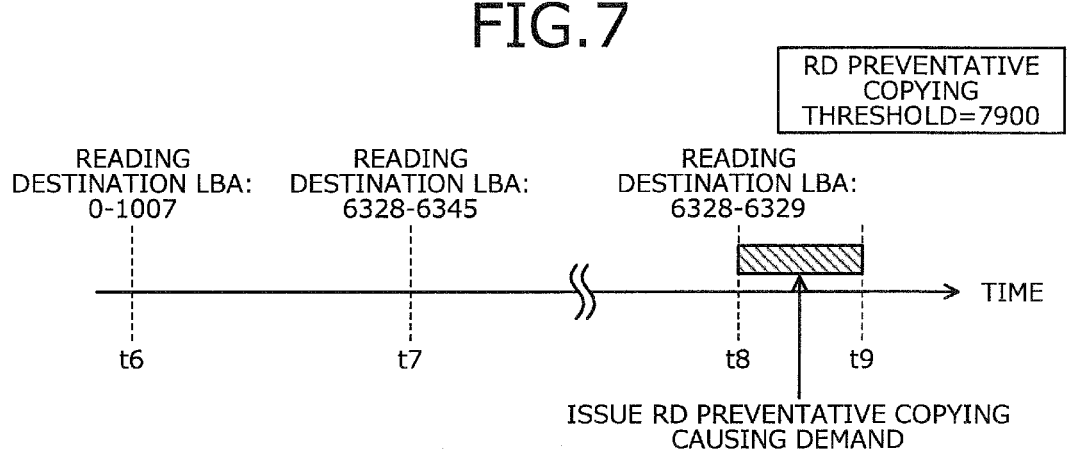
FIG. 7 is an explanatory diagram of an example of an operation for data reading.

FIG. 7 is an explanatory diagram of an example of an operation for data reading. FIG. 7 is used to describe an example in which the block prediction table 111 is updated when data is read from the storage device 120.

Occurrence of the RD preventative copying operation can be assumed by finding out how many times each group receives a reading request. When issuing a data reading request, therefore, the storage controller 101 refers to LBAs indicated in the block prediction table 111 and checks the number of times of reading from the group corresponding to the reading request. This allows the storage controller 101 to assume the number of times of reading from a block expected to include the LBAs for a reading destination included in the reading request. The number of times of reading that triggers RD preventative copying varies depending on the specification of the SSD. For example, the SSD controller executes RD preventative copying when data reading from a certain block is performed 8000 times. The storage controller 101 sets an RD preventative copying threshold representing the number of times of reading smaller than the number of times of reading at which the SSD controller executes RD preventative copying, and before the number of times of reading reaches the RD preventative copying threshold, determines that RD preventative copying may be under execution.

A specific prediction example will be described with reference to FIG. 7, which depicts a case where execution of RD preventative copying is assumed when after the third writing request of FIG. 6 is issued, the host server 201 issues the following first to third reading requests. In this case, the RD preventative copying threshold is assumed to be 790 [times].

The first reading request is issued at time t6 and includes LBAs for a reading destination as LBA0-1007. The second reading request is issued at time t7 and includes LBAs of the reading destination as LBA6328-6345. The third reading request is issued at time t8 and includes LBAs for the reading destination as LBA6328-6329. After receiving the first to third reading requests, the storage controller 101 issues each to the storage device 101. It is assumed that a reading request for either LBA1000-1007 or LBA6328-6345 is made 7897 times during a period between the second reading request and the third reading request.

At time 6, because LBA0-999 among the LBAs for the reading destination included in the first reading request belongs to G0, the storage controller 101 increases the number of times of reading from G0 by 1. Likewise, because LBA1000-1007 among the LBAs for the reading destination included in the first reading request belongs to G1, the storage controller 101 increases the number of times of reading from G1 by 1.

At time 7, because LBA6328-6345 representing the LBAs for the reading destination included in the second reading request belongs to G1, the storage controller 101 increases the number of times of reading from G1 by 1.

It is assumed that the number of times of reading from G1 reaches 7899 [times] at a point in time before time 8. At time 8, because LBA6328-6345 representing the LBAs for the reading destination included in the third reading request belongs to G1, the storage controller 101 increases the number of times of reading from G1 by 1. As a result of this increment, the number of times of reading from G1 amounts to 7900 [times], i.e., reaches the RD preventative copying threshold. Hence, the storage controller 101 determines that RD preventative copying may be under execution.

When determining that RD preventative copying may be under execution, the storage controller 101 issues the RD preventative copying causing command to the storage device 102-1. In the example of FIG. 7, the storage controller 101 issues the RD preventative copying causing command to the storage device 102-1 during a period between time 8 and time 9. When determining that RD preventative copying has been executed, the storage controller 101 resets the number of times of reading from G1, to 0 [times]. Methods of determining whether RD preventative copying has been executed include, for example, the above first method of determining RD preventative copying execution and second method of determining RD preventative copying execution.

Figure 8:
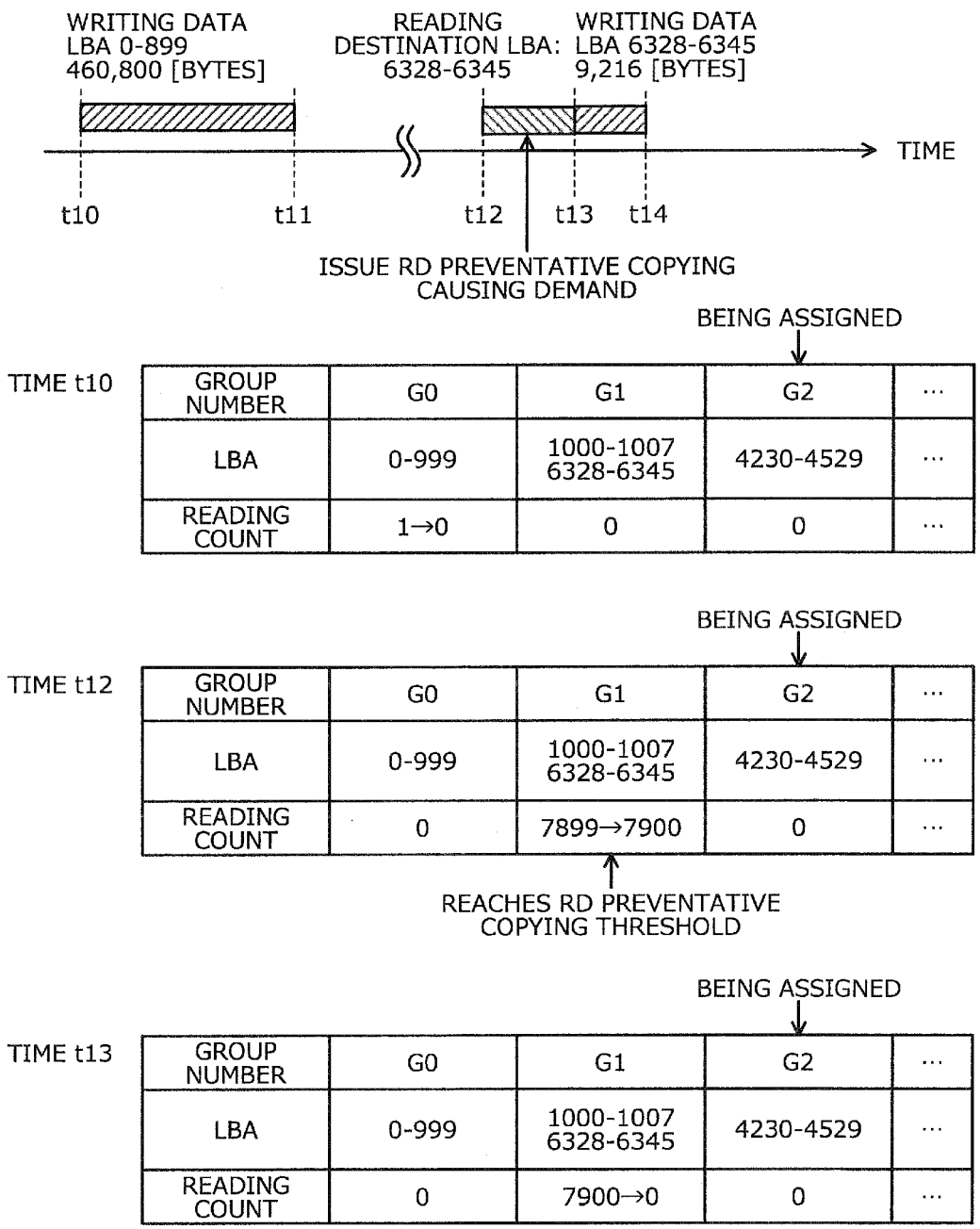
FIG. 8 is an explanatory diagram of an example of operation for overwriting.

FIG. 8 is an explanatory diagram of an example of operation for overwriting. FIG. 8 is used to describe updating of the block prediction table 111 for a case where at data writing to the storage device 102, an additional writing request is made to LBAs to which a writing request has already been made, and for a case where a writing request is made while the RD preventative copying causing command is issued.

Ordinary operation for overwriting inside the SSD will be described. When performing overwriting, the SSD executes a read-modifying writing operation block by block. For example, the SSD reads data out of the memory area of a block including LBAs for a writing destination, reflects overwriting data in the read data, and writes the data including the reflected data to the block including the LBAs for the writing destination. When executing data writing to the block, the SSD deletes the stored contents of the block first and then writes the data to the block. Writing the data to the block after deleting the stored contents of the block creates a sufficient margin between the threshold voltage set according to the volume of electrons on the floating gate and the voltage applied upon data reading. Because overwriting creates such a sufficient margin, the SSD resets the number of times of reading from the block at which data writing is executed.

Based on the above operation of the SSD, the storage controller 101 can perform a similar prediction, thereby improving the accuracy of block prediction. A specific example of updating the block prediction table 111 will be described with reference to FIG. 8, which depicts a case where after the third reading request of FIG. 7 is issued, the storage controller 101 receives a fourth writing request, a fourth reading request, and a fifth writing request from the host server 201.

The fourth writing request is issued during a period between time t10 and time t11 and includes LBAs for a writing destination as LBA0-899, of which the data size is 460,800 [bytes]. The fourth reading request is issued at time t12 and includes LBAs of a reading destination as LBA6328-6345. The fifth writing request is issued during a period between time t13 and time t14 and includes LBAs for a writing destination as LBA6238-6345. It is assumed that a reading request for either LBA1000-1007 or LBA6328-6345 is made 7899 times during a period between the fourth writing request and the fourth reading request.

When receiving the fourth writing request, to determine whether the fourth writing request is a new writing request or an overwriting request, the storage controller 101 determines whether the LBAs for the writing destination included in the fourth writing request are included in the block prediction table 111. In the example of FIG. 8, LBA0-899 belongs to G1. The storage controller 101 therefore determines that the LBAs for the writing destination included in the fourth writing request are included in the block prediction table 111 and that the fourth writing request is an overwriting request. FIG. 8 depicts a case where all LBAs for the writing destination included in the writing request are included in the block prediction table 111. However, only some of LBAs for the writing destination included in the writing request may be included in the block prediction table 111. In such a case, the storage controller 101 handles LBAs included in the block prediction table 111 among all of the LBAs for the writing destination, as LBAs for an overwriting request, and LBAs not included in the block prediction table 111 among all the LBAs for the writing destination, as LBAs for a new writing request.

At time t10, finding the fourth writing request to be an overwriting request, the storage controller 101 resets the number of times of reading from G0 including the LBAs for the writing destination included in the fourth writing request, to 0 [time]. After receiving the fourth writing request, the storage controller 101 issues the received fourth reading request to the storage device 102.

It is assumed that the number of times of reading from G1 reaches 7899 [times] at a point in time before time 12. At time 12, because LBA6328-6345 representing the LBAs for the reading destination included in the fourth reading request belongs to G1, the storage controller 101 increases the number of times of reading from G1 by 1. As a result of this increment, the number of times of reading from G1 has reached the RD preventative copying threshold. Hence, the storage controller 101 determines that RD preventative copying may possibly be executed and thus, issues the RD preventative copying causing command to the storage device 102-1.

At time t13, when receiving the fifth writing request while issuing the RD preventative copying causing command, the storage controller 101 determines whether the LBAs for the writing destination included in the fifth writing request are included in the group to be subject to RD preventative copying. In the example of FIG. 8, the LBAs for the writing destination included in the fifth writing request are included in the group G1 to be subject to RD preventative copying. The storage controller 101, therefore, stops issuing the RD preventative copying causing command, and at the same time, resets the number of times of reading from G1 to 0 [time].

Figure 9:
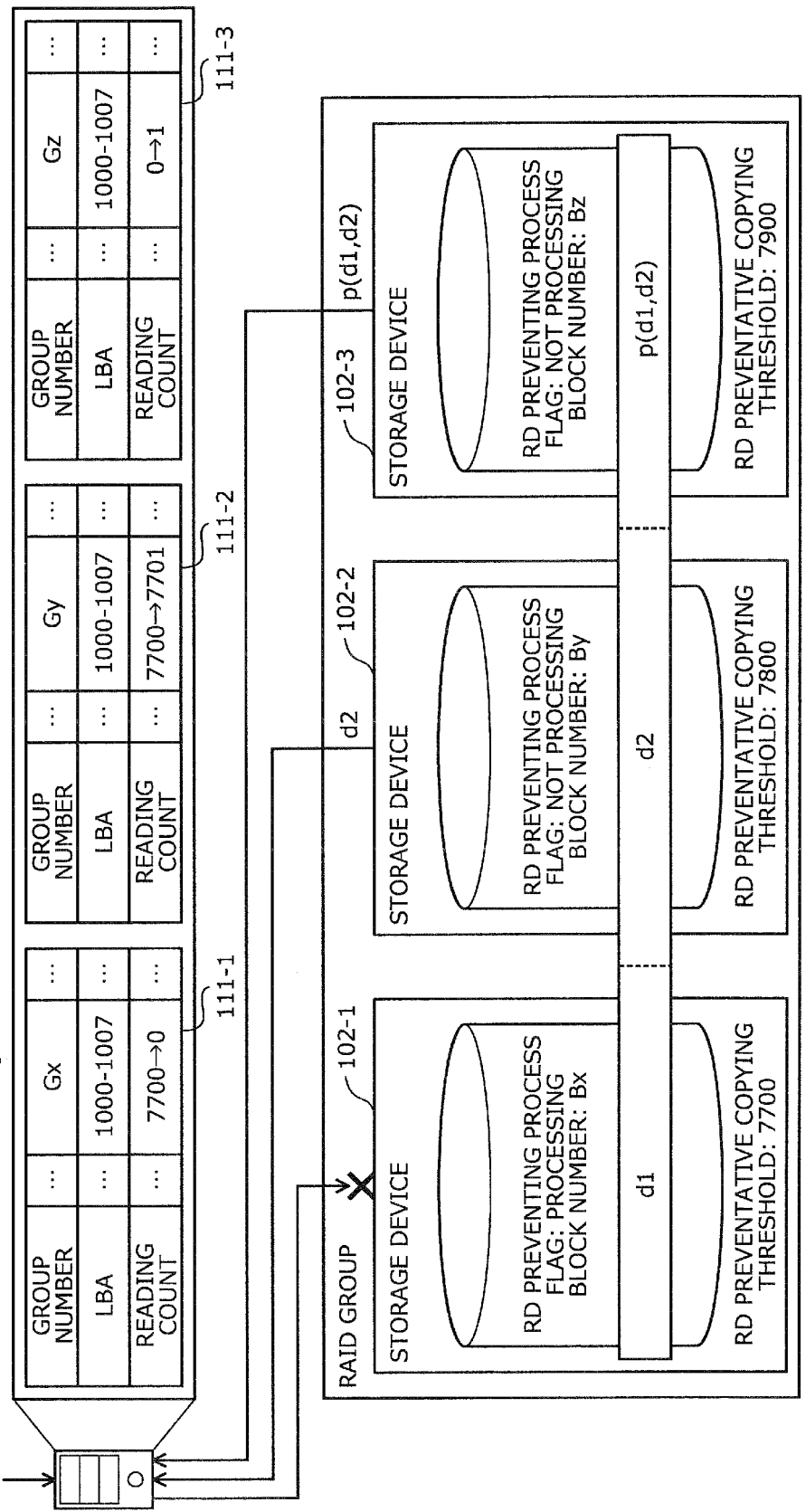
FIG. 9 is an explanatory diagram (1) of an example of setting RD preventative copying thresholds.
Figure 10:
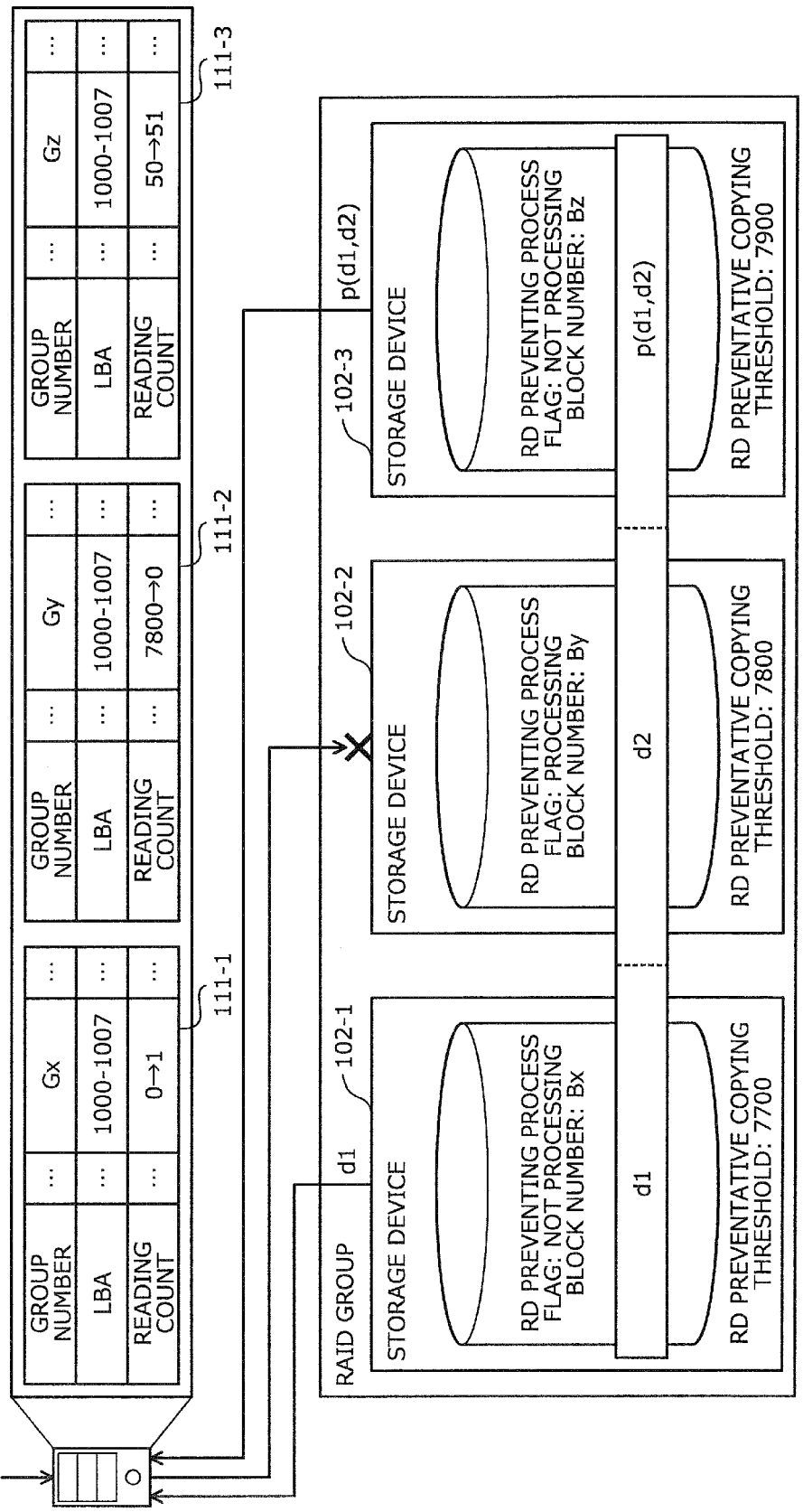
FIG. 10 is an explanatory diagram (2) of an example of setting RD preventative copying thresholds.

Examples of setting RD preventative copying thresholds will be described with reference to FIGS. 9 and 10. The examples of FIGS. 9 and 10 are described on the assumption that the storage devices 102-1 to 102-3 have common properties that makes the storage devices 102-1 to 102-3 identical in block data size and in the number of times of occurrence of RD preventative copying. In this case, the storage controller 101 sets respective RD preventative copying thresholds for the storage devices 102-1 to 102-3 to 7700 [times], 7800 [times], and 7900 [times]. The storage devices 102-1 to 102-3 provided as SSDs form a RAID group with an RAID level of RAID5, and LBA1000-1007 of the storage device 102-1, LBA1000-1007 of the storage device 102-2, and LBA1000-1007 of the storage device 102-3 form one stripe.

LBA1000-1007 of the storage device 102-1 is correlated with a block Bx, and the storage controller 101 correlates LBA1000-1007 of the storage device 102-1 with a group Gx. In the same manner, LBA1000-1007 of the storage device 102-2 is correlated with a block By, and the storage controller 101 correlates LBA1000-1007 of the storage device 102-2 with a group Gy. LBA1000-1007 of the storage device 102-3 is correlated with a block Bz, and the storage controller 101 correlates LBA1000-1007 of the storage device 102-3 with a group Gz.

In the stripe, actual data d1 and d2 are stored in the storage devices 102-1 and 102-2, respectively, and parity data p (d1, d2) generated from the actual data d1 and d2 is stored in the storage device 102-3. In the following description, for simplicity, the actual data d1 and d2 and the parity data p (d1, d2) are simply written as d1, d2, and p (d1, d2), respectively.

FIG. 9 is an explanatory diagram (1) of an example of setting RD preventative copying thresholds. In the storage system 100 of FIG. 9, the block prediction table 111-1 of FIG. 9 stores a record indicating that the number of times of reading from Gx of the storage device 102-1 is 7700 [times], the block prediction table 111-2 of FIG. 9 stores a record indicating that the number of times of reading from Gy of the storage device 102-1 is 7700 [times], and the block prediction table 111-3 of FIG. 9 stores a record indicating that the number of times of reading from Gz of the storage device 102-1 is 0 [time].

The storage controller 101 sets respective RD preventing process flags of the storage devices 102-1 to 102-3, to "not processing". The RD preventing process flag is the flag indicating whether the storage device 102 is executing RD preventative copying, and is data retained by each storage device 102. The storage controller 101, for example, stores therein the RD preventing process flag correlated with the block prediction table 111. The RD preventing process flag serves as one of two identifiers "not processing" and "processing". "not processing" is an identifier indicating that the storage controller 101 determines that the storage device 102 having the identifier is not executing RD preventative copying. "processing" is an identifier indicating that the storage controller 101 determines that the storage device 102 having the identifier is executing RD preventative copying.

A phenomenon that may occur when the same RD preventative copying threshold is set for each storage device 102 will be described. It is highly possible that data reading from storage devices 102 included in the same RAID group is performed almost evenly, in which case the numbers of times of reading from the storage devices 102 become close to one another. The numbers of times of reading from the storage devices 102 that become close to each other may bring about a state where at a certain point in time, multiple storage devices 102 to which the RD preventative copying causing command is issued exist together. In such a state, if the number of storage devices 102 to which the RD preventative copying causing command is not issued becomes smaller than the number of storage devices 102 capable of data restoration, the storage controller 101 becomes incapable of acquiring response data to a reading request until determining that RD preventative copying has been executed.

To prevent such a problem, the storage controller 101 sets RD preventative copying thresholds to be staggered among the storage devices 102. In the example of FIG. 9, the number of times of reading from Gx of the storage device 102-1 reaches 7700 [times], which is the RD preventative copying threshold for the storage device 102-1, and therefore, the storage controller 101 suppresses reading from Gx of the storage device 102-1. After suppressing reading from Gx, the storage controller 101 sets the RD preventing process flag of the storage device 120 to "processing" and issues the RD preventative copying causing command to the storage device 102-1. When determining that RD preventative copying has been executed after issuing the command, the storage controller 101 resets the number of times of reading from Gx of the storage device 102-1 to 0 [time] and sets the RD preventing process flag of the storage device 120 to "not processing".

A case is assumed where the host server 201 issues a reading request for LBA1000-1007 of the storage device 120-1 during suppression of reading, as indicated in FIG. 9. In this case, the storage controller 101 reads d2 from the storage device 120-2 and p (d1, d2) from the storage device 120-3. As a result of this data reading, the storage controller 101 increases the number of times of reading from Gy of the storage device 120-2 and the same from Gz of the storage device 120-3, by 1. Subsequently, the storage controller 101 restores d1 from d2 and p (d1, d2) and sends d1 to the host server 201.

FIG. 10 is an explanatory diagram (2) of an example of setting RD preventative copying thresholds. The state of the storage system 100 depicted in FIG. 10 is the result of a change of the state of the storage system 100 of FIG. 9 that is caused by execution of the following first and second operations.

The first operation is operation such that a reading request for LBA1000-1007 of the storage device 102-1 is issued 49 times during the issue of multiple RD preventative copying causing commands to the storage device 102-1. Responding to the first operation, the storage controller 101 increases the number of times of reading from Gy and the same from Gz, by 49.

The second operation is operation such that a reading request for LBA1000-1007 of the storage device 102-2 is issued 50 times in total during and after the issue of multiple RD preventative copying causing command to the storage device 102-1. Responding to the second operation, the storage controller 101 increases the number of times of reading from Gy by 50.

As a result of the first and second operations, updated values are entered in the block prediction tables 111 of FIG. 10 in the following manner. For example, the number of times of reading from Gx of the storage device 102-1 is entered as 0 [times] in the block prediction table 111-1 of FIG. 10. The number of times of reading from Gy of the storage device 102-2 is entered as 7800 [times] in the block prediction table 111-2 of FIG. 10. The number of times of reading from Gz of the storage device 102-3 is entered as 50 [times] in the block prediction table 111-3 of FIG. 10.

In the example of FIG. 10, the number of times of reading from Gy of the storage device 102-2 reaches 7800 [times], which is the RD preventative copying threshold for the storage device 102-2, and therefore, the storage controller 101 suppresses reading from Gy of the storage device 102-2. After suppressing reading from Gy, the storage controller 101 sets the RD preventing process flag of the storage device 120-2 to "processing" and issues multiple RD preventative copying causing commands to the storage device 102-2. When determining that RD preventative copying has been executed after the issue the multiple commands, the storage controller 101 resets the number of times of reading from Gy of the storage device 102-2 to 0 [times] and sets the RD preventing process flag of the storage device 120-2 to "not processing".

A case is assumed where the host server 201 issues a reading request for LBA1000-1007 of the storage device 120-2 during suppression of reading, as indicated in FIG. 10. In this case, the storage controller 101 reads d1 from the storage device 120-1 and p (d1, d2) from the storage device 120-3. As a result of this data reading, the storage controller 101 increases the number of times of reading from Gx of the storage device 120-1 and the same from Gz of the storage device 120-3, by 1. Subsequently, the storage controller 101 restores d2 from d1 and p (d1, d2) and sends d2 to the host server 201.

In this manner, by setting RD preventative copying thresholds that are staggered among the storage devices 102, periods during which RD preventative copying is executed can be staggered among the storage devices 102. By staggering the periods during which RD preventative copying is executed, the storage system 100 can prevent a situation where data acquisition in a mirroring configuration is impossible or data restoration utilizing data parity is impossible.

An example of the dissociation of a block managed by the storage device 102 from a group assumed by the storage controller 101, and caused by garbage collection will be described with reference to FIG. 11. An example of cancelling the dissociation by a refreshing process will be described with reference to FIG. 12. It is assumed for the cases of FIGS. 11 and 12 that the storage device 102-1 performs garbage collection.

Figure 11:
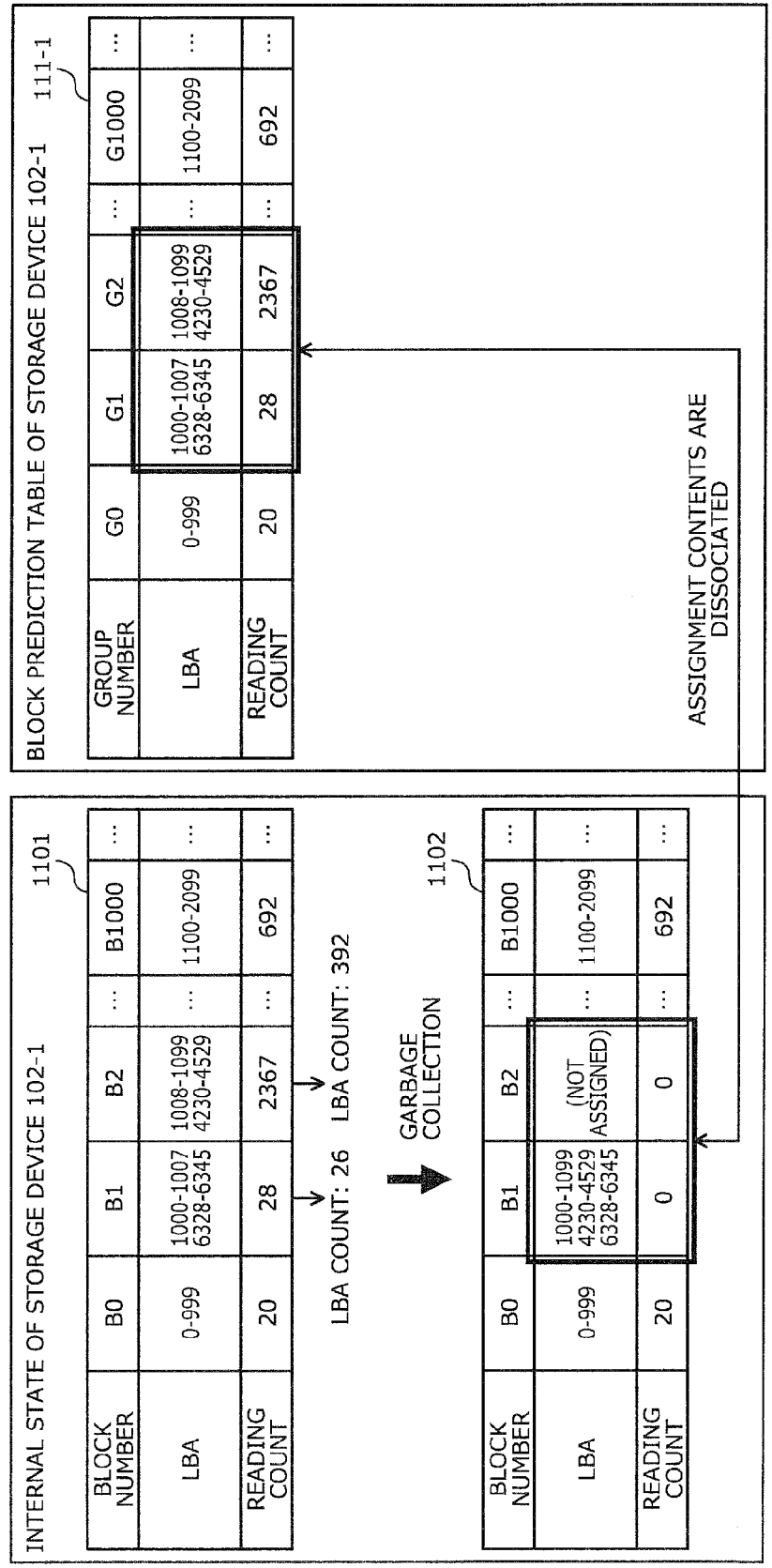
FIG. 11 is an example of dissociation of a block from a group that results when garbage collection is executed.

FIG. 11 is an example of the dissociation of a block from a group that results when garbage collection is executed. A table 1101 is a table indicating the relation between blocks managed by the storage device 102 and LBA assignment before execution of garbage collection. A table 1102 is a table indicating the relation between blocks managed by the storage device 102 and LBA assignment after execution of garbage collection.

Before execution of garbage collection, as indicated in the table 1101 and the block prediction table 111-1, LBA0-999 of the storage device 102-1 is correlated with the block B0 as LBA0-999 is included in G0 by the storage controller 101. The number of times of reading from B0 as well as the number times of reading from G0 is 20 times.

LBA1000-1007 and 6328-6345 of the storage device 102-1 are correlated with the block B1 as LBA1000-1007 and 6328-6345 are included in G1 by the storage controller 101. The number of times of reading from B1 as well as the number times of reading from G1 is 28 times.

LBA1008-1099 and 4230-4529 of the storage device 102-1 are correlated with the block B2 as LBA1008-1099 and 4230-4529 are included in G2 by the storage controller 101. The number of times of reading from B2 as well as the number times of reading from G2 is 2367 times.

LBA1100-2099 of the storage device 102-1 is correlated with the block B1000 as LBA1100-2099 is included in G1000 by the storage controller 101. The number of times of reading from B1000 as well as the number times of reading from G1000 is 692 times.

In this state, the storage device 120-1 executes garbage collection. For example, the SSD controller of the storage device 102-1 determines that the number of LBAs collected by putting together LBAs included in B1 and B2 does not exceed 1000, which is the number of LBAs that can be placed in one block, since that the LBA count in B1 is 26 and the LBA count in B2 is 392. The SSD controller of the storage device 102-1 transfers data at LBA1008-1099 and 4230-4529 stored in memory area of B2 to memory area of B1.

Following execution of garbage collection, LBA1008-1099 and 4230-4529 of the storage device 102-1, together with LBA1000-1007 and 6328-6345, are correlated with B1. Meanwhile, the storage controller 101 assigns LBA1000-1007 and 6328-6345 to G1 and LBA1008-1099 and LBA4230-4529 to G2 by grouping. This result indicates the dissociation of blocks and groups in terms of LBA assignment.

Figure 12:
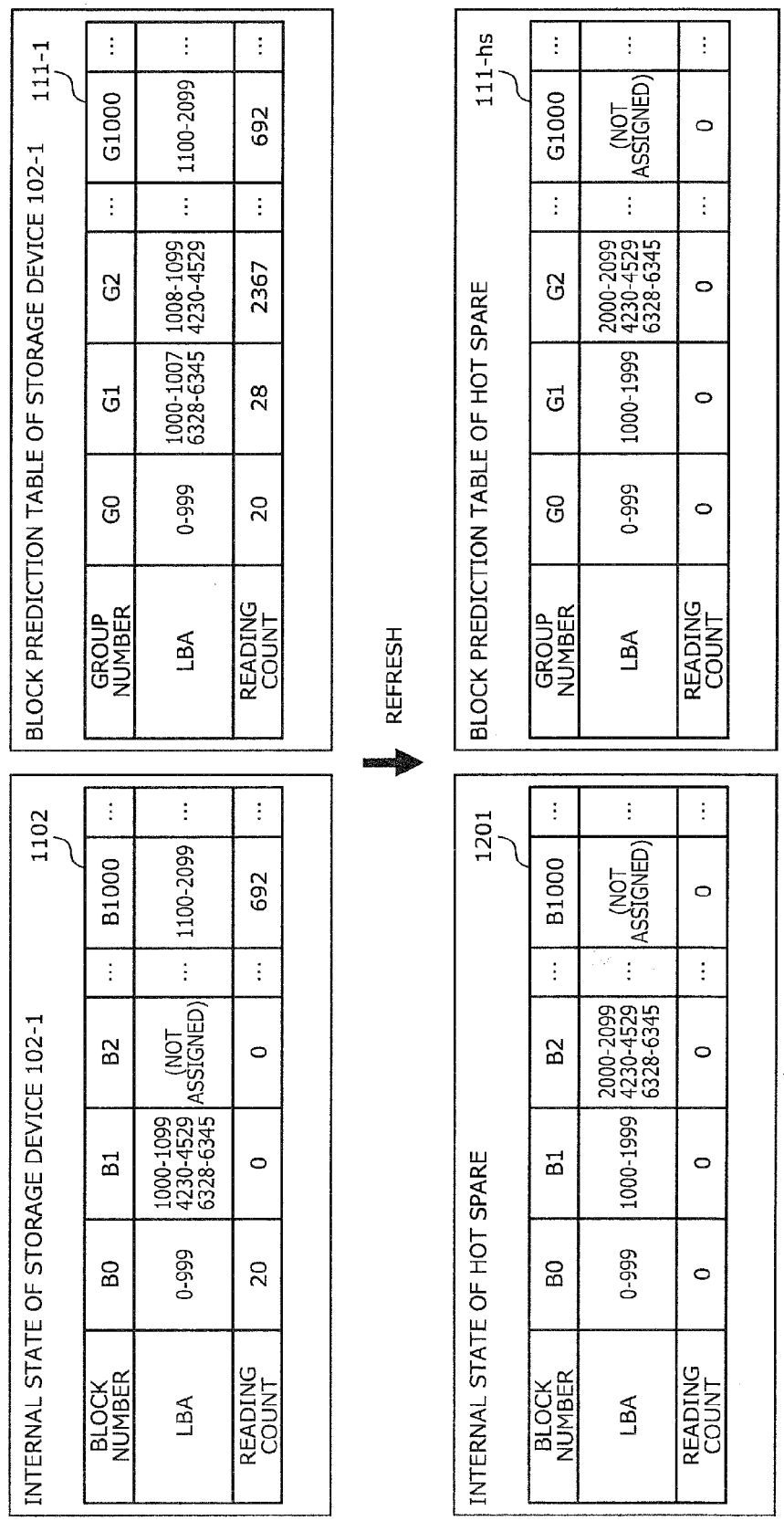
FIG. 12 is an explanatory diagram of an example of the relation between blocks and groups before and after execution of a refreshing process.

FIG. 12 is an explanatory diagram of an example of the relation between blocks and groups before and after execution of the refreshing process. The refreshing process is the process of handling a storage device 102 having dissociated LBA assignment contents as a transfer origin storage device 102 and transferring given data that is to be transferred and stored in the transfer origin storage device 102 to a transfer destination storage device 102, thereby redefining the relation between groups and LBAs. It is preferable that the transfer destination storage device 102 be an unused storage device 102 with no LBA assignment thereto. This is because that data transfer to a storage device 102 in use with LBA assignment thereto may lead to a case where the transfer destination storage device 102 already has dissociated LBA assignment contents. In the example of FIG. 12, the transfer destination storage device 102 is the hot spare 202, which is the storage device 102 provided as an SSD.

Data transfer methods include the following first transfer method and second transfer method. According to the first transfer method, the storage controller 101 issues a data transfer request to a transfer origin storage device 102, which transmits the given data directly to a transfer destination storage device 102. According to the second transfer method, a transfer origin storage device 102 having received a data transfer request transmits the given data to the storage controller 101, which transmits the given data to a transfer destination storage device 102. In this embodiment, the first transfer method is employed.

In both cases of the first and second transfer methods, the storage controller 101 performs data transfer such that an interval of transferring given data among data to be transferred to the transfer destination storage device 102, the data to be transferred being grouped so that grouped data is included in one group, does not exceed the given interval di. For example, it is assumed that 512 [K bytes] data of an LBA group, which is grouped so that grouped data is included in one group, is transmitted in the form of divided data of 256 [K bytes] to the destination storage device 120, and that the time between the completion of transfer of the first 256 [K bytes] of data and completion of transfer of the second 256 [K bytes] of data exceeds the given interval di. In this case, the LBA group grouped by the storage controller 101 so that grouped data is included in one group is assigned to two blocks of the transfer destination storage device 102. Hence, the dissociation of LBA assignment contents results.

In the case of the first transfer method, to prevent the data transfer interval from exceeding the given interval di, the administrator of the storage system 100 checks whether the data transfer interval of the storage device 102 is within the given interval di when building the storage system 100. In the case of the second transfer method, for example, the storage controller 101 temporarily saves incoming to-be-transferred data from the transfer origin storage device 102 in a buffer and then transfers the data in the form of blocks of data of each block data size.

A data transfer request includes LBAs indicating the memory area in which to-be-transferred data is stored and information for identifying a storage device 102 to which the to-be-transferred data is transferred.

An example of an operation of the refreshing process will be described with reference to FIG. 12. The storage controller 101 issues to the storage device 102-1, a data transfer request for transferring LBA0-2099, 4230-4529, and 6328-6345 to the hot spare 202.

The storage controller 101 selects the head LBA of LBAs not grouped yet. In the example of FIG. 12, the storage controller 101 selects LBA0. The storage controller 101 then assigns LBA0-999 having a size not exceeding 512 [K bytes], i.e., the block data size of the hot spare 202, and including the selected head LAB, to G1 by grouping.

Subsequently, the storage controller 101 selects LBA1000 that is the head LBA of LBAs not grouped yet. The storage controller 101 then assigns LBA1000-1999 having a size not exceeding 512 [K bytes] and including the selected head LAB, to G1 by grouping.

Subsequently, the storage controller 101 selects LBA2000 that is the head LBA of LBAs not grouped yet. The storage controller 101 then assigns LBA2000-2099, 4230-4529, and 6328-6345 having a size not exceeding 512 [K bytes] and including the selected head LAB, to G2 by grouping. Having grouped all LBAs, the storage controller 101 ends the refreshing process.

Following the refreshing process, the storage controller 101 adds the hot spare 202 to the RAID group to which the storage device 102-1 belongs, and removes the storage device 102-1 from the RAID group to define the storage device 102-1 as a new hot spare. The storage controller 101 may put the stored contents of the hot spare 202 after the data transfer, back to the storage device 102-1, thereby keeps the makeup of the RAID group as it is.

In this manner, the relation between groups and LBA assignment assumed by the storage controller 101 matches the relation between blocks and LBA assignment under management by the hot spare 202. This improves the accuracy of prediction of LBAs that trigger RD preventative copying. In the example of FIG. 12, the contents of a block prediction table 111-$hs$ indicating prediction of the relation between groups and LBA assignment of the hot spare 202 matches the contents of a table 1201 indicating the relation between blocks and LBA assignment under management by the hot spare 202.

The refreshing process is executed in various cases. For example, the storage controller 101 regularly executes the refreshing process. The storage controller 101 may execute the refreshing process when determining that LBA assignment contents are dissociated. By executing one of methods of determining the dissociation of LBA assignment contents, for example, the storage controller 101 determines the dissociation of LBA assignment contents using a combination of the first method for determining RD preventative copying execution and the second method for determining RD preventative copying execution.

For example, a case is assumed where the number of times of reading from a certain group of the storage device 102 reaches the RD preventative copying threshold and according to the first method for determining RD preventative copying execution, the storage controller 101 issues the RD preventative copying causing command the second count to the storage device 102. After issuing the command, when a response from the storage device 102 is not delayed, the storage controller 101 determines that RD preventative copying is not executed at the storage device 102 and therefore, LBA assignment contents are dissociated, according to the second method for determining RD preventative copying execution. Upon determining that LBA assignment contents are dissociated, the storage controller 101 executes the refreshing process. The storage controller 101 may execute the refreshing process when determining that the number of times of determinations of dissociation of LBA assignment contents exceeds a given value.

An example of determining that LBA assignment contents are dissociated in a state before the refreshing process of FIG. 12 is executed will be described. It is assumed that the RD preventative copying threshold is 7900 [times] and the number of times of reading that triggers RD preventative copying by the storage device 102 is 8000 [times]. It is also assumed that after the state indicated by the table 1102 and block prediction table 111-1 of FIG. 12 results, the refreshing process is not execute and the host server 201 issues a reading request for LBA1008-1099 of the storage device 102-1 5533 times.

When the above assumed situation results, the storage controller 101 increases the number of times of reading from G2 including LBA1008-1099 indicated in the block prediction table 111-1, by 5533. As a result of this increment, the number of times of reading from G2 is 2367+5533=7900. Because the number of times of reading has reached the RD preventative copying threshold of 7900 times, the storage controller 101 issues the RD preventative copying causing command 100 [times], to the storage device 102-1.

At the point in time at which the reading request for LBA1008-1099 is issued 5533 [times], however, the storage device 102-1 recognizes the number of times of reading from B1 as 5533 [times]. Therefore, the storage device 102, which receives the RD preventative copying causing command 100 [times], does not execute RD preventative copying on B1 because the number of times of reading from B1 does not reach 8000 [times] yet. As a result, the storage device 102-1 sends a response to the RD preventative copying causing command, to the storage controller 101 without any delay. In this manner, the storage controller 101 can determine that the LBA assignment contents are dissociated, by checking the number of times of issuing the RD preventative copying causing command and the response time to the issued RD preventative copying causing command.

By executing the refreshing process upon determining that the LBA assignment contents are dissociated, the storage device 101 can execute the refreshing process more efficiently than in the case of regularly executing the refreshing process. For example, if a response delay occurs, the storage controller 101 executes the refreshing process to suppress the response delay. When a response delay does not occur, the storage controller 101 is allowed to reduce the number of times of data writing to a transfer destination storage device 102. The number of times of data writing to the floating gate inside the SSD is limited, and writing data to the floating gate given number of times or more frequently deteriorates the insulating film in the floating gate, in which case the memory cell becomes incapable of recording information. By reducing the number of times of data writing, therefore, the storage controller 101 can extend a period in which the transfer destination storage device 102 operates without failing.

Flowcharts of procedures executed by the storage controller 101 will be described with reference to FIGS. 13 to 17.

Figure 13:
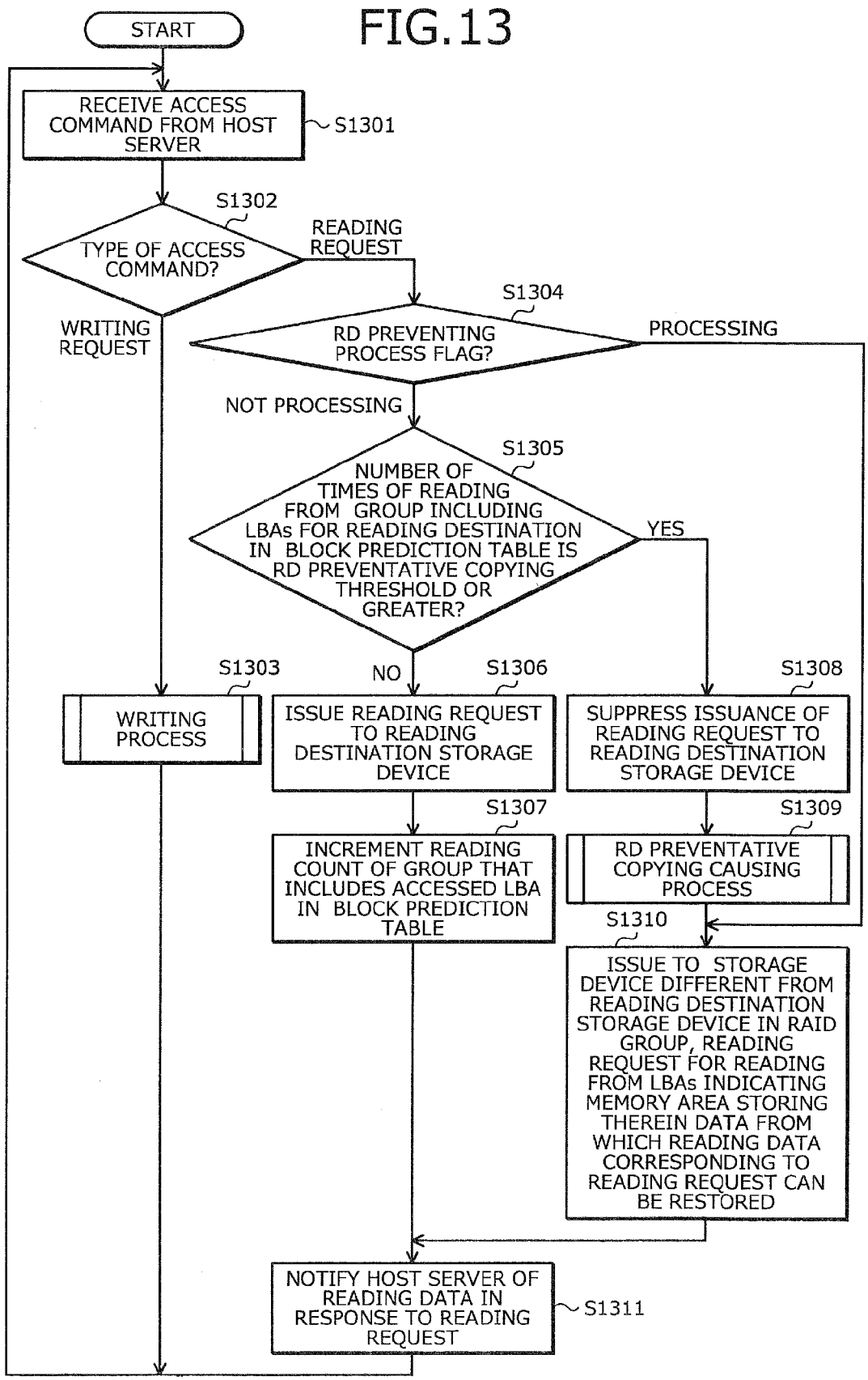
FIG. 13 is a flowchart of an example of a storage device control procedure.

FIG. 13 is a flowchart of an example of a storage device control procedure. The storage device control procedure is a procedure for controlling the storage device 102 according to an access command from the host server 201.

The storage controller 101 receives an access command from the host server 201 (step S1301). The storage controller 101 then checks the type of the access command, determining whether the type of the access command is a writing request or a reading request (step S1302). When the type of the access command is a writing request (step S1302: writing request), the storage controller 101 executes a writing process (step S1303). The details of the writing process will be described later with reference to FIGS. 14 and 15.

When the type of the access command is a reading request (step S1302: reading request), the storage controller 101 checks the RD preventing process flag and determines whether the RD preventing process flag matches the identifier "not processing" or the identifier "processing" (step S1304). When the RD preventing process flag is the identifier "not processing" (step S1304: "not processing"), the storage device 101 determines if the number of times of reading from a group including LBAs for a reading destination in the block prediction table 111 is the RD preventative copying threshold or greater (step S1305).

When the number of times of reading from the group including the LBAs for the reading destination in the block prediction table 111 is less than the RD preventative copying threshold (step S1305: NO), the storage controller 101 issues a reading request to a reading destination storage device 102 (step S1306). As a result of issuing the request, the storage controller 101 acquires data as a response to the reading request. The storage controller 101 then increases the number of times of reading from the group including the accessed LBAs in the block prediction table, by 1 (step S1307)

When the number of times of reading from the group including the LBAs for the reading destination in the block prediction table 111 is the RD preventative copying threshold or greater (step S1305: YES), the storage controller 101 suppresses the issuance of a reading request to the reading destination storage device (step S1308). The storage controller 101 then executes an RD preventative copying causing process (step S1309). The details of the RD preventative copying causing process will be described later, referring to FIG. 16.

The storage controller 101 executes steps S1309 and S1310 such that it executes a process of S1310 after starting a process of step S1309. For example, after starting a thread for executing the RD preventative copying causing process, the storage controller 101 may simultaneously execute a thread for executing the storage device control process and the thread for executing the RD preventative copying causing process by parallel processing of multiple threads. When the CPU 301 is made up of multiple cores, a certain core among the multiple cores may execute the thread for executing the storage device control process while a different core executes the thread for executing the RD preventative copying causing process.

After starting the operation at step S1309, the storage controller 101 issues to a storage device 102 different from the reading destination storage device 102 in an RAID group, a reading request for reading from LBAs indicating a memory area storing therein data from which reading data corresponding to the reading request can be restored (step S1310). The reading request at step S1310 is a reading request from the host server 201. When the RD preventing process flag indicates "processing" (step S1304: "processing"), the storage controller 101 executes the operation at step S1310.

In executing the operation at step S1310, for example, when the reading destination storage device 102 belongs to a RAID group of RAID1, the storage controller 101 issues a reading request to a storage device 102 serving as a mirroring destination in the RAID group. The storage controller 101 then acquires reading data identical in contents with data corresponding to the reading request issued by the host server 201, from the mirroring destination storage device 102.

When the reading destination storage device 102 belongs to a RAID group of RAID5, the storage controller 101 issues a reading request to all storage devices 102 other than the reading destination storage device 102 in the RAID group of RAID5. The storage controller 101 then acquires parity data and, from among a data group used for generating the parity data, data other than reading data stored in the reading destination storage device 102. The storage controller 101 then restores the reading data stored in the reading destination storage device 102, using the acquired parity data and data other than reading data stored in the reading destination storage device 102.

After finishing the operation at step S1307 or step S1310, the storage controller 101 transmits reading data as a response to the reading request, to the host server 201 (step S1311). After finishing the operation at step S1303 or step S1311, the storage controller 101 proceeds to step S1301. By executing the storage device control procedure, the storage controller 101 can control the storage device 102 according to an access command from the host server 201.

Figure 14:
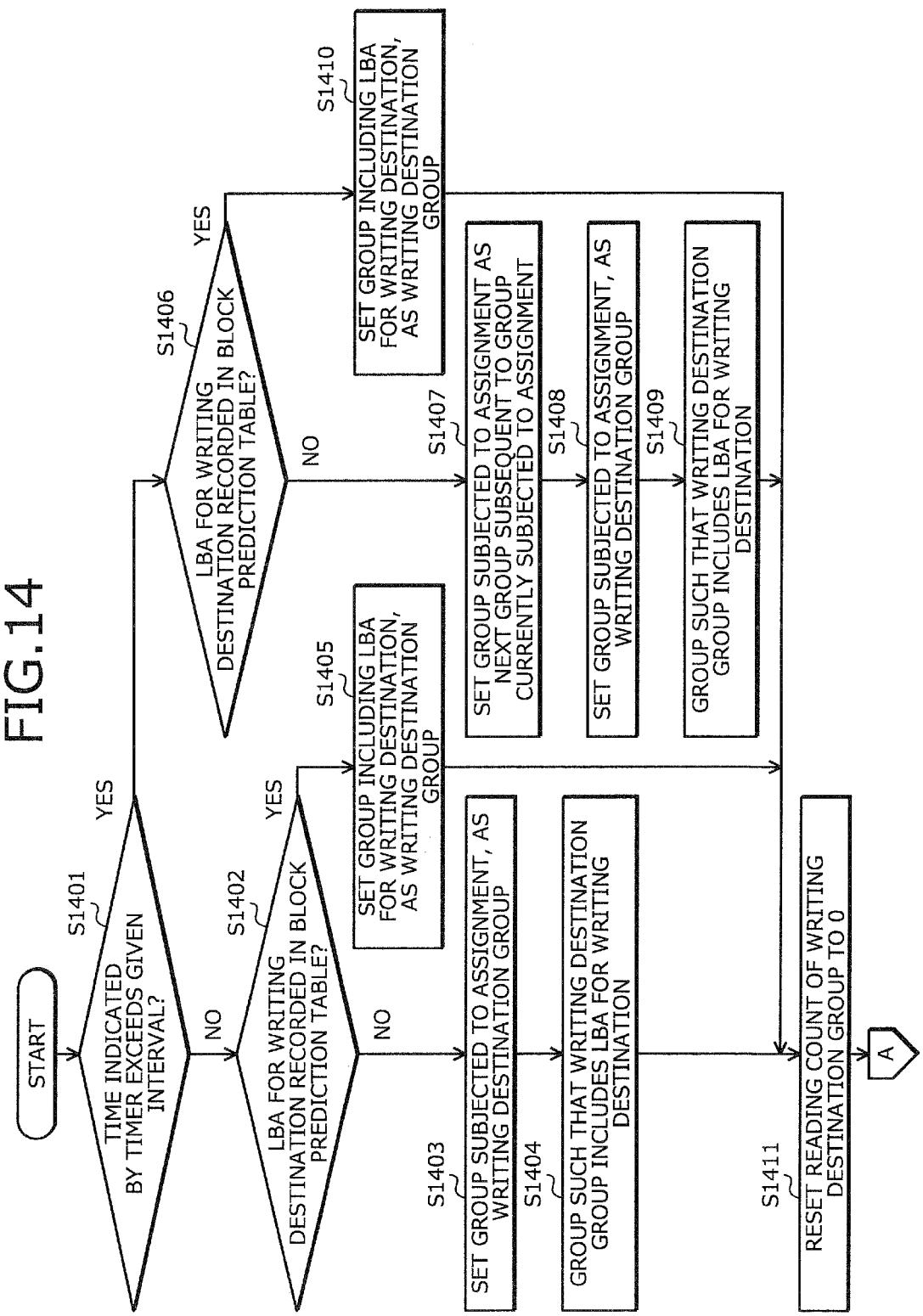
FIG. 14 is a flowchart (1) of an example of a writing procedure.
Figure 15:
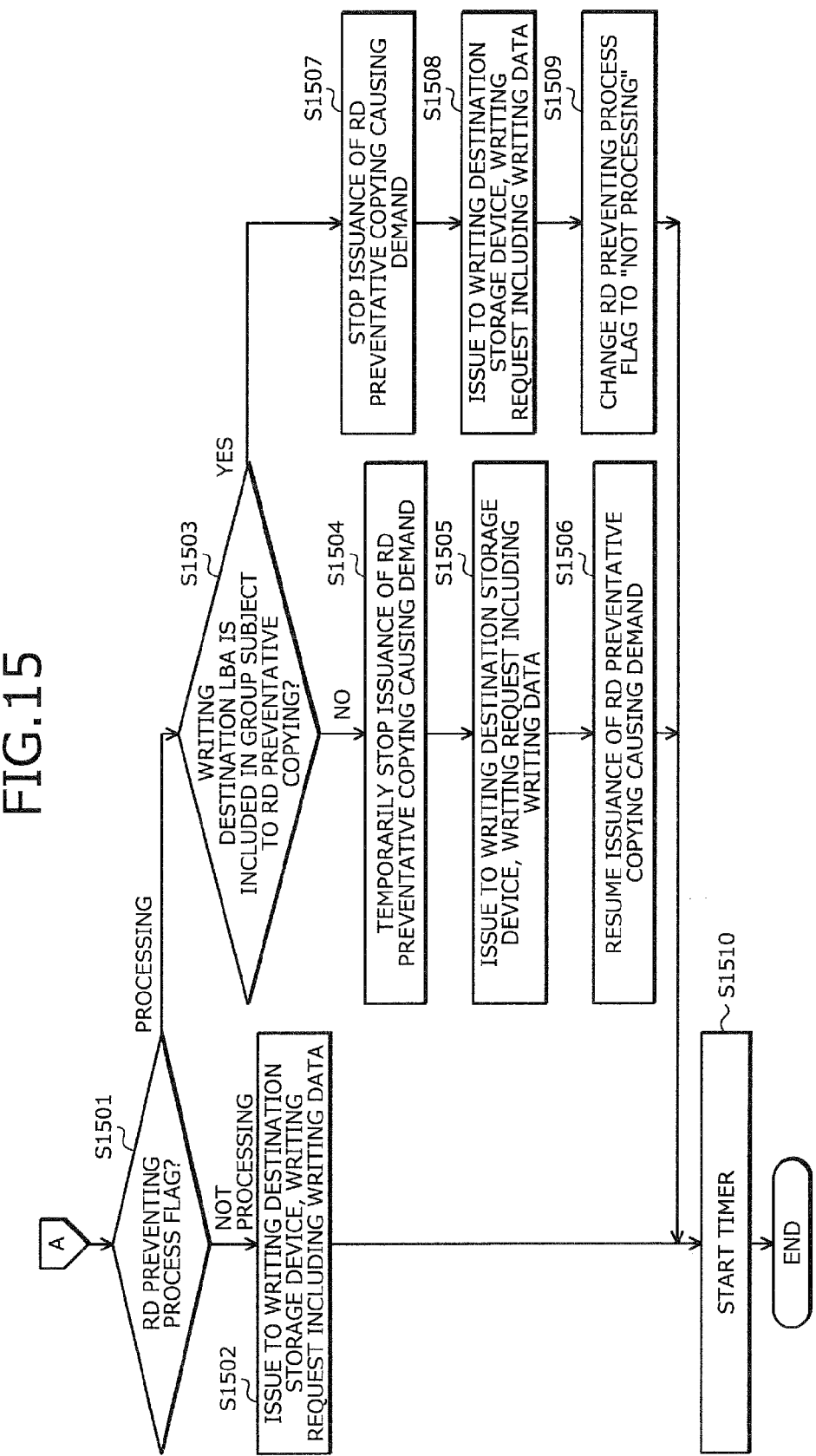
FIG. 15 is a flowchart (2) of an example of the writing procedure.

FIG. 14 is a flowchart (1) of an example of a writing procedure, and FIG. 15 is a flowchart (2) of an example of the writing procedure. The writing procedure is a procedure that is executed when an access command from the host server 201 is a writing request.

The storage controller 101 determines whether the time indicated by the timer exceeds the given interval di (step S1401). At this time, if a writing destination storage device 102 is a storage device 102 with no LBA assigned thereto, that is, with no data written thereto, the timer is not started yet. In this case, the storage controller 101 concludes step S1401: NO.

When a time indicated by the timer does not exceed the given interval di (step S1401: NO), the storage controller 101 determines whether LBAs for a writing destination are recorded in the block prediction table 111 for the writing destination storage device 102 (step S1402). When the LBAs for the writing destination are not recorded in the block prediction table 111 (step S1402: NO), the storage controller 101 determines a writing request from the host server 201 to be a new writing request, and sets a group subjected to LBA assignment as a writing destination group (step S1403). The storage controller 101 then performs grouping such that the writing destination group includes the LBAs for the writing destination (step S1404). After finishing the operation at step S1404, the storage controller 101 stores group information generated by grouping in the block prediction table 111. When the LBAs for the writing destination are recorded in the block prediction table 111 (step S1402: YES), the storage controller 101 determines the writing request from the host server 201 to be an overwriting request, and sets a group including the LBAs for the writing destination as a writing destination group (step S1405).

When a time indicated by the timer exceeds the given interval di (step S1401: YES), the storage controller 101 determines whether LBAs for a writing destination are recorded in the block prediction table 111 for the writing destination storage device 102 (step S1406). When the LBAs for the writing destination are not recorded in the block prediction table 111 (step S1406: NO), the storage controller 101 determines a writing request from the host server 201 to be a new writing request, and sets a group subjected to LBA assignment as the next group subsequent to the group currently subjected to LBA assignment (step S1407). The storage controller 101 then sets the group subjected to LBA assignment as a writing destination group (step S1408). Subsequently, the storage controller 101 performs grouping such that the writing destination group includes the LBAs for the writing destination (step S1409). After finishing the operation at step S1409, the storage controller 101 stores group information generated by grouping in the block prediction table 111. When the LBAs for the writing destination are recorded in the block prediction table 111 (step S1406: YES), the storage controller 101 determines the writing request from the host server 201 to be an overwriting request, and sets a group including the LBAs for the writing destination as a writing destination group (step S1410).

At steps S1405 and S1410, the storage controller 101 groups the LBAs for the writing destination such that the data size corresponding to LBAs included in the same group does not exceed the block data size. When the size of the LBAs for the writing destination is not within the block data size, the storage controller 101 divides the LBAs for the writing destination into multiple groups of LBAs in the order of LBAs.

After finishing one of the operations at steps S1404, S1405, S1409, and S1410, the storage controller 101 resets the number of times of reading from the writing destination group to zero (step S1411). When the writing request from the host server 201 is an overwriting request, by executing step S1411, the storage controller 101 resets the number of times of reading from a block including LBAs included in the writing request.

After finishing the operation at step S1411, the storage controller 101 checks the RD preventing process flag and determines whether the RD preventing process flag matches the identifier "not processing" or the identifier "processing" (step S1501). When the RD preventing process flag is the identifier "not processing" (step S1501: "not processing"), the storage device 101 issues a writing request including writing data, to the writing destination storage device 102 (step S1502).

When the RD preventing process flag is the identifier "processing" (step S1501: "processing"), the storage controller 101 determines whether the LBAs for the writing destination are included in a group to be subjected to RD preventative copying (step S1503).

When the LBAs for the writing destination are not included in the group to be subjected to RD preventative copying (step S1503: NO), the storage controller 101 temporarily stops issuing the RD preventative copying causing command (step S1504). The storage controller 101 then issues a writing request including writing data to the writing destination storage device 102 (step S1505). Subsequently, the storage controller 101 starts issuing the RD preventative copying causing command again (step S1506).

When the LBAs for the writing destination are included in the group to be subjected to RD preventative copying (step S1503: YES), the storage controller 101 stops issuing the RD preventative copying causing command (step S1507). The storage controller 101 then issues a writing request including writing data to the writing destination storage device 102 (step S1508). Subsequently, the storage controller 101 sets the RD preventing process flag to "not processing" (step S1509).

After finishing one of the operations at steps S1502, S1506, and S1509, the storage controller 101 starts the timer (step S1510). After finishing the operation at step S1510, the storage controller 101 ends the writing procedure. By executing the writing procedure, the storage controller 101 can control the storage device 102 according to a writing request from the host server 201.

FIG. 16 is a flowchart of an example of an RD preventative copying causing procedure. The RD preventative copying causing procedure is the procedure that causes the storage device 102 to execute RD preventative copying. The block prediction table 111 and the RD preventing process flag indicated in the procedure of FIG. 16 are equivalent to the block prediction table 111 and the RD preventing process flag of the reading destination storage device 102 of FIG. 13. For simpler description, in FIG. 16, the block prediction table 111 and the RD preventing process flag are mentioned without adding the phrase "of the reading destination storage device 102" thereto.

The storage controller 101 sets the RD preventing process flag to "processing" (step S1601). The storage controller 101 then issues the RD preventative copying causing command to a reading destination storage device (step S1602). Subsequently, the storage controller 101 determines whether RD preventative copying has been executed (step S1603). Methods of determining whether RD preventative copying has been executed includes the above first method for determining RD preventative copying execution and the second method for determining RD preventative copying execution.

When RD preventative copying has not been executed (step S1603: NO), the storage controller 101 proceeds to step 1602. When RD preventative copying has been executed (step S1603: YES), the storage controller 101 resets the number of times of reading from a group including LBAs for a reading destination in the block prediction table, to zero (step S1604). Subsequently, the storage controller 101 sets the RD preventing process flag to "not processing" (step S1605). After finishing the operation at step S1605, the storage controller 101 ends the RD preventative copying procedure. By executing the RD preventative copying procedure, the storage controller 101 can causes the storage device 102 to execute RD preventative copying.

FIG. 17 is a flowchart of an example of a refreshing procedure. The refreshing procedure is the procedure by which given data that is to be transferred and is stored in a transfer origin storage device 102 is transferred to a transfer destination storage device 102 to redefine the relation between groups and LBAs.

The storage controller 101 issues to the transfer origin storage device 102, a data transfer request for transferring all LBAs of a transfer origin storage device 102 to a transfer destination storage device 102 (step S1701). The storage controller 101 then selects the head LBA from the block prediction table 111 of the transfer origin storage device 102 (step S1702). Subsequently, the storage controller 101 sets a group of the transfer destination storage device 102 and to be subjected to LBA assignment, as the head group (step S1703).

The storage controller 101 then performs grouping such that one block of LBAs with the selected LBA at the head are included in the group subjected to LBA assignment in the block prediction table of the transfer destination storage device 102 (step S1704). Subsequently, the storage controller 101 determines whether all LBAs of the transfer origin storage device 102 have been assigned to groups created by grouping (step S1705).

If LBAs not assigned to any group are present among the LBAs of the transfer origin storage device 102 (step S1705: NO), the storage controller 101 selects the head LBA of LBAs not assigned to any group among the LBAs of the transfer origin storage device 102 (step S1706). Subsequently, the storage controller 101 sets a group subjected to LBA assignment as the next group to the group currently subjected to LBA assignment (step S1707). After finishing the operation at step S1707, the storage controller 101 proceeds to step S1704.

When having assigned all LBAs of the transfer origin storage device 102 to groups created by grouping (step S1705: YES), the storage controller 101 ends the refreshing procedure. By executing the refreshing procedure, the storage controller 101 can cancel the dissociation of the relation between groups and LBA assignment managed by the storage device 102 from the relation between groups and LBA assignment assumed by the storage controller 101.

As described above, the storage controller 101 counts the number of times of reading from a group created by grouping LBAs included in a writing request in blocks, and based on the counted number of times of reading from the group, issues a reading request for reading original data or redundant data to the storage device 102. Through this process, the storage controller 101 can assume LBAs reading of which is expected to cause RD preventative copying. The storage controller 101, therefore, can suppress a drop in response performance to a reading request from the host server 201. The storage controller 101 can prevent timing of the internal process of the storage device 102 and timing of issue of a reading request from the storage controller 101 from overlapping each other, thereby offers a stable response time.

The storage controller 101 may group LBAs included in a writing request in blocks according to the writing request received by the storage controller 101. This allows the storage controller 101 to perform grouping in pursuant to a writing request to the storage device 102, thus suppressing a drop in the accuracy of prediction of LBAs that are expected to cause RD preventative copying.

According to a reading request to the storage device 102, the storage controller 101 may reset the number of times of reading from a group in response to the issue of a writing request to LBAs included in a group including LBAs for a reading destination included in the reading request. When overwriting is executed, the SSD controller resets the number of times of reading from a block corresponding to the overwriting. This allows the storage controller 101 to suppress a drop in prediction accuracy.

The storage controller 101 may issue the RD preventative copying causing command to the storage device 102 and reset the number of times of reading from a group, when the number of times of reading from the group is equal to or larger than the RD preventative copying threshold. In this case, the storage controller 101 issues to the storage device 102, the RD preventative copying causing command the number of times given by subtracting the RD preventative copying threshold from the prescribed number of times set according to the specification of the storage device, or continues issuing the RD preventative copying causing command that causes the storage device 102 to execute RD preventative copying until the response time to the command exceed a given time. Through this process, the storage controller 101 causes in advance RD preventative copying of LBAs that are expected to trigger RD preventative copying. If RD preventative copying is completed before reception of a reading request from the host server 201, no delay in responding to the reading request from the host server 201 results. Hence, the storage controller 101 can suppress a drop in response performance to a reading request from the host server 201.

During the issue of the RD preventative copying command, in response to the issue of a writing request to LBAs included in a group including LBAs for the RD preventative copying causing command, the storage controller 101 may stops issuing the command and reset the number of times of reading from the group. When overwriting is executed, the SSD controller resets the number of times of reading from a block corresponding to the overwriting. This allows the storage controller 101 to improve the accuracy of prediction of the number of times of reading. Overwriting does not require RD preventative copying. Hence the storage controller 101 stops issuing the command to avoid issuing an unnecessary command.

The storage controller 101 may perform grouping such that an interval of issuing a writing request including LBAs included in the same group to the storage device 102 does not exceed the given interval di. This allows the storage controller 101 to improve the accuracy of prediction of the relation between blocks and LBA assignment by the storage device 102.

The semiconductor memory of the storage device 102 of this embodiment may be a NAND-type flash memory. Read disturb occurs more frequently in the NAND-type flash memory than in the NOR-type flash memory. The SSD controller that controls the NAND-type flash memory, therefore, executes RD preventative copying more frequently. By controlling the storage device 102 having the NAND-type flash memory through the storage device control method of this embodiment, therefore, a state of a delay in response performance, which arises in many cases, is prevented to suppress a drop in response performance.

If the number of times of reading from a group is the RD preventative copying threshold or greater, the storage controller 101 may issue a reading request for LBAs indicating the address of data out of which reading destination data can be restored, to a different storage device 12 in response to a reading request for LBAs included in the group. This allows the storage controller 101 to respond to a reading request from the host server 201 while avoiding a storage device 102 that is expected to cause RD preventative copying, thus suppressing a drop in response performance to the reading request.

When a group of storage devices 102 form a RAID group having the same properties, the storage controller 101 may set RD preventative copying thresholds for the storage devices 102 to be staggered. By setting RD preventative copying thresholds to be staggered, the storage controller 101 can stagger the periods of execution of RD preventative copying between the storage devices 120. By staggering the periods of execution of RD preventative copying, the storage system 100 can prevent a situation where data acquisition in a mirroring configuration is impossible or data restoration utilizing data parity is impossible and thereby, suppress drops in performance response to a reading request.

The storage controller 101 may transfer data that is to be transferred and is stored in a transfer origin storage device 102 to a transfer destination storage device 102 and thereby, redefine the relation between groups and LBAs. Through this process, the storage controller 101 matches the relation between groups and LBA assignment assumed by the storage controller 101 to the relation between blocks and LBA assignment managed by the transfer destination storage device 102, thus improving the accuracy of prediction of LBAs that trigger RD preventative copying.

The storage controller 101 performs grouping and counting of the number of times of reading from a group for a transfer destination storage device 102. For the transfer destination storage device 102, therefore, the storage controller 101 can assume LBAs that trigger RD preventative copying.

The storage device control method of this embodiment can be realized by running a prepared program on a computer, such as a personal computer and workstation. The storage device control program is recorded on a non-transitory, computer-readable recording medium, such as a hard disk, flexible disk, and optical disk, is read from the recording medium by the computer, and executed. The storage device control program may be distributed through a network, such as the Internet.

According to one aspect of the present invention, an effect of suppressing a drop in response performance to a reading request for a storage device is achieved.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A storage controller that performs control for storing in a memory area of a storage device, data that is grouped into redundant data in blocks each having a given data size, the storage controller comprising:
   a memory configured to store therein group information created by grouping performed such that logical addresses for a writing destination identified from a data writing request are correlated with the blocks; and
   a processor configured to
      count in response to a received data reading request, a number of times of reading from a group including logical addresses for a reading destination identified from the data reading request, based on the group information, and
      issue based on the counted number of times of reading from the group that includes the logical addresses for the reading destination, any one among a reading request that includes the logical addresses for the reading destination and a reading request that includes logical addresses for a storage destination of redundant data corresponding to data of the logical addresses for the reading destination, wherein
   the memory area is a memory area of a semiconductor memory where copying control for copying data from a first block to a second block is executed when data reading from the first block is executed a prescribed number of times, and
   the processor
      issues, consequent to the counted number of times of reading from the group reaching a first count that is less than the prescribed number of times, a reading request including the logical addresses included in the group, such that the copying control for data of the logical addresses included in the group is started; and
      issues, in response to an other data reading request received during issuance of the reading request, a reading request including logical addresses for a storage destination of redundant data corresponding to data of logical addresses for a reading destination of the other data reading request.

2. The storage controller according to claim 1, wherein the storage controller controls the storage device including the semiconductor memory and other storage device different from the storage device, the other storage device storing therein redundant data of the data stored in the storage device, and
   the processor issues to the other storage device, in response to the data reading request received after the counted number of times of reading from the group exceeds the first count, a reading request that includes logical addresses for a storage destination of redundant data corresponding to data of logical addresses for a reading destination, when the logical addresses for the reading destination identified from the reading request are included in the group.

3. The storage controller according to claim 1, wherein the processor, consequent to the counted number of times of reading from the group reaching the first count and such that the copying control for data of logical addresses included in the group is started, issues a reading request that includes logical addresses included in the group with a second count that is obtained by subtracting the first count from the prescribed number of times, or continues issuing to the storage device, the reading request until a response time to the reading request exceeds a given time, and resets the number of times of reading from the group.

4. The storage controller according to claim 3, wherein the processor consequent to issuing for the second count, the reading request that includes logical addresses included in the group or continuously issuing the reading request until the response time to the reading request exceeds the given time, stops issuing the reading request that includes logical addresses included in the group and resets the number of times of reading from the group.

5. The storage controller according to claim 1, wherein the processor resets the number of times of reading from the group, in response to an issuance of a writing request that includes logical addresses included in the group to the first storage device.

6. The storage controller according to claim 2, wherein the memory stores therein group information concerning the other storage device and created by grouping performed such that logical addresses for a writing destination of the other storage device identified from a writing request are correlated with each of the blocks, and
   the processor,
      in response to a received data reading request, counts the number of times of reading from a group that includes logical addresses for a reading destination of the other storage device identified from the reading request, based on the group information on the other storage device, and
      consequent to the counted number of times of reading from the group reaching a third count that is less than the prescribed number of times and different from the first count, issues for a fourth count obtained by subtracting the third count from the prescribed number of times, a reading request that includes logical addresses included in the group or continues issuing to the other storage device, the reading request until the response time to the reading request exceeds a given time, and then resets the number of time of reading from the group.

7. The storage controller according to claim 1, wherein the storage controller controls an other storage device that is a transfer destination storage device different from the storage device and executes data writing in blocks into which the memory area of the semiconductor memory is divided for a given data size, and the processor
  issues to the storage device, when a garbage collection is executed by the storage device, a data transfer request that includes logical addresses included in a plurality of groups created by grouping logical addresses for a writing destination of the storage device identified from a received writing request,
  issues the data transfer request so that an interval of transferring data to be transferred from the storage device to the other storage device does not exceed a given interval,
  generates group information concerning the other storage device for which logical addresses included in the issued data transfer request are correlated with the blocks and grouped, and
  switches an issue destination of the reading request including logical addresses included in the data transfer request to the other storage device.

8. A control method of a storage controller that performs control for storing in a memory area of a storage device, data that is grouped into redundant data in blocks each having a given data size, wherein the memory area is a memory area of a semiconductor memory where copying control for copying data from a first block to a second block is executed when data reading from the first block is executed a prescribed number of times, the control method comprising:
  the storage controller counting in response to a received data reading request, a number of times of reading from a group that includes logical addresses for a reading destination identified from the data reading request, based on group information created by grouping performed such that the logical addresses for a writing destination are correlated with the blocks;
  the storage controller issuing based on the counted number of times of reading from the group that includes the logical addresses for the reading destination, any one among a reading request that includes the logical addresses for the reading destination and a reading request that includes logical addresses for a storage destination of redundant data corresponding to data of the logical addresses for the reading destination;
  the storage controller issuing, consequent to the counted number of times of reading from the group reaching a first count that is less than the prescribed number of times, a reading request including the logical addresses included in the group, such that the copying control for data of the logical addresses included in the group is started; and
  the storage controller issuing, in response to an other data reading request received during issuance of the reading request, a reading request including logical addresses for a storage destination of redundant data corresponding to data of logical addresses for a reading destination of the other data reading request.

9. A non-transitory, computer-readable recording medium storing a control program of a storage controller that performs control for storing in a memory area of a storage device, data that is grouped into redundant data in blocks each having a given data size, wherein the memory area is a memory area of a semiconductor memory where copying control for copying data from a first block to a second block is executed when data reading from the first block is executed a prescribed number of times, the control program causing the storage controller to execute a process comprising:
  counting in response to a received data reading request, a number of times of reading from a group that includes logical addresses for a reading destination identified from the data reading request, based on group information created by grouping performed such that logical addresses of the reading destination identified from a data writing request are correlated with the blocks;
  issuing based on the counted number of times of reading from the group that includes the logical addresses for the reading destination, any one among a reading request that includes the logical addresses for the reading destination and a reading request that includes logical addresses for a storage destination of redundant data corresponding to data of the logical addresses for the reading destination;
  issuing, consequent to the counted number of times of reading from the group reaching a first count that is less than the prescribed number of times, a reading request including the logical addresses included in the group, such that the copying control for data of the logical addresses included in the group is started; and
  issuing, in response to an other data reading request received during issuance of the reading request, a reading request including logical addresses for a storage destination of redundant data corresponding to data of logical addresses for a reading destination of the other data reading request.

* * * * *